United States Patent
Othmer et al.

(10) Patent No.: US 8,077,832 B2
(45) Date of Patent: Dec. 13, 2011

(54) SYSTEMS AND METHODS FOR CONSENT-BASED RECORDING OF VOICE DATA

(75) Inventors: Konstantin Othmer, Mountain View, CA (US); Brett Wells Nottingham, San Jose, CA (US)

(73) Assignee: Speechink, Inc., Mountain View, CA (US)

( * ) Notice: Subject to any disclaimer, the term of this patent is extended or adjusted under 35 U.S.C. 154(b) by 1254 days.

(21) Appl. No.: 11/745,391

(22) Filed: May 7, 2007

(65) Prior Publication Data

US 2007/0211876 A1 Sep. 13, 2007

Related U.S. Application Data

(63) Continuation-in-part of application No. 10/969,487, filed on Oct. 20, 2004, now Pat. No. 7,227,930.

(51) Int. Cl.
*H04M 1/64* (2006.01)
(52) U.S. Cl. .... 379/85; 370/352; 455/412.1; 455/414.1; 709/203; 709/206
(58) Field of Classification Search ...... 379/67.1–88.28, 379/201.01, 201.11, 207.02, 207.11, 229, 379/265.01–266.1; 704/270, 270.1; 709/201–203, 709/206–207; 370/351–356; 455/412.1–417
See application file for complete search history.

(56) References Cited

U.S. PATENT DOCUMENTS

| | | | |
|---|---|---|---|
| 6,072,860 A | 6/2000 | Kek et al. | |
| 6,389,398 B1 | 5/2002 | Lustgarten et al. | |
| 6,401,066 B1 * | 6/2002 | McIntosh | 704/273 |
| 6,430,270 B1 * | 8/2002 | Cannon et al. | 379/88.19 |
| 6,665,376 B1 * | 12/2003 | Brown | 379/85 |
| 6,766,000 B2 * | 7/2004 | Squibbs et al. | 379/88.23 |
| 6,987,841 B1 * | 1/2006 | Byers et al. | 379/88.17 |
| 7,738,638 B1 * | 6/2010 | Henderson | 379/88.17 |
| 2001/0016491 A1 * | 8/2001 | Imura et al. | 455/432 |
| 2002/0016175 A1 | 2/2002 | Marce et al. | |
| 2002/0118798 A1 * | 8/2002 | Langhart et al. | 379/67.1 |
| 2002/0160751 A1 * | 10/2002 | Sun et al. | 455/412 |
| 2003/0069804 A1 | 4/2003 | Barry et al. | |
| 2003/0130016 A1 * | 7/2003 | Matsuura et al. | 455/569 |
| 2004/0001573 A1 * | 1/2004 | Gusler et al. | 379/67.1 |
| 2004/0203927 A1 | 10/2004 | Kraft | |
| 2005/0113113 A1 | 5/2005 | Reed | |
| 2005/0226395 A1 * | 10/2005 | Benco et al. | 379/85 |
| 2006/0067303 A1 * | 3/2006 | Murakami et al. | 370/352 |
| 2006/0198504 A1 * | 9/2006 | Shemisa et al. | 379/201.02 |
| 2007/0133524 A1 * | 6/2007 | Kwon | 370/356 |
| 2007/0274293 A1 * | 11/2007 | Forbes | 370/352 |
| 2008/0037725 A1 * | 2/2008 | Berstis et al. | 379/88.13 |

* cited by examiner

*Primary Examiner* — Hemant Patel
(74) *Attorney, Agent, or Firm* — Maschoff Gilmore & Israelsen

(57) ABSTRACT

Wireless telecommunications systems, methods and devices for processing voice data in connection with a wireless telecommunications system that includes a wireless remote device and a wireless recording device that are configured for communication with a network server. Methods include obtaining varying levels of consent from users of recording devices and/or remote devices. The recording device can access recording rules that cross-reference the consent information to determine whether to record the conversation if the recording statute indicates that such recording is lawful.

20 Claims, 15 Drawing Sheets

SYSTEMS AND METHODS FOR CONSENT-BASED RECORDING OF VOICE DATA

RELATED APPLICATIONS

This application is a continuation-in-part application of U.S. patent application Ser. No. 10/969,487, filed Oct. 20, 2004, and entitled "Systems and Methods for Criteria-Based Recording of Voice Data," now U.S. Pat. No. 7,227,930 issued Jun. 5, 2007, which application is incorporated herein by reference in its entirety.

BACKGROUND OF THE INVENTION

1. Field of the Invention

The present invention relates generally to telecommunications systems, methods and devices. More particularly, exemplary embodiments of the invention concern systems and methods directed to selectively capturing consent to record communication sessions, capturing voice data during a communication session, such as a telephone call, and managing the recorded voice data.

2. Related Technology

As a result of various technological advances, the functionality and capabilities of traditional, landline telephones and wireless communication devices such as mobile telephones, "smart phones" and telephony-enabled personal digital assistants (PDAs) (hereinafter referred to as wireless communication devices) have correspondingly improved and expanded. In particular, a significant advancement in this regard is the relative increase in memory capacity associated with wireless communication devices. Such expanded memory capacity lends itself to a variety of useful applications. For example, improved memory capacity allows additional applications to be employed in connection with the wireless communication device, thereby enhancing its overall functionality. Another technical advancement in wireless communication is the ability to identify the geographical location of the user of a wireless communication device at any point in time. Together, these technologies enable a particularly useful application for communication devices, namely, the ability of users to record their conversations with other parties. As discussed below, this functionality is useful for a variety of reasons.

For example, a user may wish to record a conversation with his or her stockbroker so in the event that a dispute arises concerning directions given to the stockbroker by the user, a transcript of the recorded conversation can be used to resolve the dispute. On the reverse side, with increasingly stringent securities laws, the stock portfolio brokerage house may require traders to keep records of client communications. Currently, traders maintain records such as letters, email and instant messaging exchanges, as well as in-person client meetings. However, it would be beneficial to document a telephone conversation. Thus, one or both parties to a conversation may be motivated to preserve the conversation for future reference or for historical, archival, or other purposes. Additionally, journalists and reporters often find it useful to record conversations. Finally, it is frequently desirable for law enforcement personnel to be able to record telephone conversations since such conversations often provide useful evidence that can later be used in the prosecution of civil or criminal investigations.

While there is little question that the ability to record conversations conducted by way of devices such as wireless and landline telephones is useful in many cases, certain complications may arise when one of the parties to the conversation is either unwilling to have the conversation recorded or is unaware that the conversation is being recorded. In this regard, there are a variety of state and federal wiretap laws, violations of which can expose the recording party to both civil and criminal liability, that identify various circumstances under which such conversations may or may not be recorded. The situation is further complicated by the fact that wiretap laws may vary from one jurisdiction to another.

Thus, it is often the case that a party who wishes to record a telephone conversation, for example, cannot be certain that recordation of the telephone call is lawful unless that party is familiar with the applicable laws for the location from which the recording party is calling and knows with some degree of certainty the location of the other party to the call. Moreover, even if the prospective recording party were to request information from the other party concerning the location of that party, there may be little assurance that such other party will provide truthful information. Even where a party intends to provide accurate location information, that party may not know its location to the degree of accuracy necessary. In either case, the ability of the prospective recording party to ascertain the lawfulness of recording a conversation is compromised.

A related difficulty concerning the lawfulness of recording telephone conversations concerns the inherent ability of a wireless communication device user to move from one location to another during the pendency of the conversation. That is, because the location of one or both of the parties to the conversation, or to subsequent conversations, may change from day-to-day or hour-to-hour, the party desiring to record the conversation cannot be certain of the jurisdiction wherein the other party is located and, accordingly, can be severely handicapped in determining whether or not any particular conversation or portion of the conversation can be lawfully recorded. Moreover, the availability of technologies and features such as call forwarding and virtual phone numbers make it even more difficult for a party wishing to record a conversation to reliably determine the geographical location of the other party or parties in order to determine and comply with the applicable wire tap laws.

Further, even when the location of the parties to a conversation can be reliably located, the party desiring to record the conversation may be faced with a situation where the wiretap laws of one jurisdiction indicate that the recording of the conversation is lawful, while the wiretap laws of another jurisdiction in which one of the parties is located indicate that the recording of the conversation is unlawful. Such a situation may arise, for example, where one party to the conversation is in one state and the other party to the conversation is located in another state at the time the conversation takes place. In cases such as these, it may be difficult for the party desiring to record the conversation to reach a decision as to whether or not to record, since the recording may be illegal in one jurisdiction, but not in the other jurisdiction. Moreover, it is likewise unclear as to which jurisdictional wiretap laws should take precedence in the event of a conflict. A related consideration is that federal wiretap laws may apply to conversations that take place across state lines, or conversations where one party is located outside the United States.

A related concern is that the fact that wiretap laws may vary from one jurisdiction to another does not necessarily shield the recorder from liability if the recorder elects to record the conversation consistent with the more lenient wiretap laws. In particular, an aggrieved party may elect to 'forum shop' and bring an action in the jurisdiction with the relatively stricter wiretap laws.

Finally, as a practical matter, if the user is not a legal expert, it is difficult for a person to be knowledgeable of all of the wiretap laws in every single jurisdiction in which a potential conversant may happen to be present.

Problems such as those discussed above can prove highly detrimental. This is particularly true in the context of law enforcement efforts where, as noted above, recorded telephone conversations can provide valuable evidence. However, violations of the applicable statutes may result in the inadmissibility of such evidence.

In view of the foregoing, it would be advantageous to provide methods, systems and devices that can attempt to determine the geographical location of the parties to a communication session and, based on the applicable wiretap laws, facilitate the process of meeting the requirements for lawfully recording the voice data and then record the voice data. In the event that the system cannot reliably determine the geographical locations of the parties to the communication session, the current best way to ensure the legality of recording the voice data from a communication session is to obtain the explicit consent of the parties to the conversation, regardless of the jurisdiction in which the parties reside. Similarly, if the recording party wishes to obtain explicit consent from the parties to record the voice data, it would be advantageous to provide a system that can manage the process of obtaining and recording the consent manifested by the parties. The system should further provide for automatic notification to the parties that the voice data is being recorded. Finally, the system should also provide functionality that allows a recording party to record only his or her own voice and not the voices of the other parties to the communication session, as well as provide for the proper storage and handling of any voice data ultimately recorded.

BRIEF SUMMARY OF AN EXEMPLARY EMBODIMENT OF THE INVENTION

In general, exemplary embodiments of the invention concern wireless and/or landline telecommunications systems, devices and methods directed to determining the locations of parties to a communication session, and recording the voice data transmitted during the communication session based on the wiretap laws for those locations or making recommendations to the recording party for lawfully recording the voice data. More specifically, embodiments of the invention provide for attempting to locate the parties to the communication session, notifying the parties that voice data is being recorded; obtaining, recording and managing the consent of the parties to the communication session to record the voice data, capturing selected voice or other transmitted data, associating the recorded voice data with the consent given, and storing and managing the recorded voice data, associated consent and associated access rules. In one embodiment, a recording party may decide to record only his or her own voice data from the communication session, and not record the voice data generated by the other parties to the communication session.

In one exemplary embodiment of the invention, recording management client software is installed on a wireless communication device to implement a method for recording voice data transmitted during a communication session. A communication session may be defined as the transmission of data, including voice data, using any combination of wireless or landline devices and using any type of network, including the Public Switched Telephone Network (PSTN), a cellular network, and wireless local area network (WLAN), a packet data based network such as the Internet, or any other type of network or combination of networks capable of transmitting data between the devices.

For convenience in describing embodiments of the invention, a communication session may be referred to herein as a "telephone call", a "call" or a "conversation"; however the invention should not be construed to be limited to conventional telephone calls. The wireless or landline communication device may be referred to in various ways, depending upon its role with respect to voice data that is sent between devices during a communication session. When these terms are used to identify and distinguish the communication devices that are used in a communication session in which voice data is recorded, the term "recording device" is defined as the device that is operated by the user or "recording party" who initiates, requests and/or controls the recording operations using the recording management software installed on the device. These recording operations can be performed to record incoming voice data received at the recording device from another party participating in the communication session, to record voice data generated locally at the recording device, or both.

Various technologies and file formats used for recording audio data can be used in conjunction with the systems and methods of the present invention. Depending on the configuration of the recording device, voice data may be formatted and stored using EVRC, MP3, WMA or any other audio format suitable for use on wireless devices. The recorded voice data may then be stored locally on the recording device or uploaded to a server using any of a number of transport protocols, such as MMS. Alternatively, the recorded voice data can be streamed to a server as it is recorded using User Datagram Protocol (UDP), Real Time Streaming Protocol (RTSP), HTTP or any other suitable data streaming protocol and stored for later access. As described in greater detail below, the recording operation can be performed locally at the recording device or at a remote recording device, such as a recording management server, that is controlled by the recording party who operates the recording device.

In this context, the term "remote device" is defined as the device that is operated by the "remote party" participating in the communication session, or, in other words, by the non-recording party. The remote device may or may not have the recording management client software installed.

The communication devices used by the parties to a communication session are suitably equipped to establish network connectivity and engage in communication over a network. An exemplary wireless communication device generally comprises a processor that communicates with a transmitter with global positioning system ("GPS") functionality, a receiver, and a memory. An input/output ("I/O") connection or other device of comparable functionality for sending data over a network is also provided so as to enable uploading of recorded conversations.

The recording management client software installed on the wireless device implements recording management functionality such as 'record,' 'record setup,' and 'standby.' More particularly, the recording management client software enables a recording party to obtain and record consent from the parties, record voice data on demand, specify or access predetermined settings and preferences such as criteria for automatically recording voice data, store the recorded voice data locally on the device, and upload or stream the voice data to the recording management server.

The recording management server is employed in support of the recording functionality on the recording device and may perform various functions, including determining and tracking device location, maintaining information pertaining to wiretap laws, notifying the parties to the conversation that the voice data is being recorded, receiving and storing recorded consent and voice data, and managing data recording rules, user profiles, access permissions, and recorded voice data.

Various methods are described below which obtain consent configurations for a recording device and/or remote device. In one embodiment, consent from parties involved in a communication session can be obtained upon initiation of a communication session. In another embodiment, consent can be obtained after a communication session has been initiated or at the end of a communication session. In still another embodiment, a user of a recording device can set consent configurations in an address book, using a menu application on the recording device, and/or using group list management tools. The consent configurations can then allow automatic recording if all participants agree. Alternatively, the consent configurations can be cross-referenced with other rules (e.g., jurisdictional rules) that may allow recording of the conversation even if less than all participants agree.

In any case, the recorded voice data, along with any consent obtained from any of the remote parties, may then be stored locally on the device for access at a later time. The recorded voice data may also be uploaded from the device, using any of a number of standard transport protocols, and stored on the recording management server, where the recorded voice data can be further processed and accessed in accordance with certain rules and permissions. Embodiment of the invention also provide for efficient storing of recorded data.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with wireless communication devices, such as wireless telephones and radios, in connection with which software and various methods and processes may be employed that reliably guide the user in the recording, efficient preservation of recordings, and use of recorded voice data transmitted during a communication session. Among other things, embodiments of the invention make use of the wiretap laws of various jurisdictions in order to make a determination as to whether or not voice data may be recorded and if so, with what sort of constraints or permissions on use and access. Embodiments of the invention further provide methods for obtaining and managing consent given by the parties of a communication session to record voice data, as well as methods for recording only the voice data of the recording party and not recording the voice data of the remote parties. In addition, embodiments of the invention provide methods for accessing and managing recorded voice data after the communication session has terminated.

I. Operating Environments and Associated Devices

Figure 1:
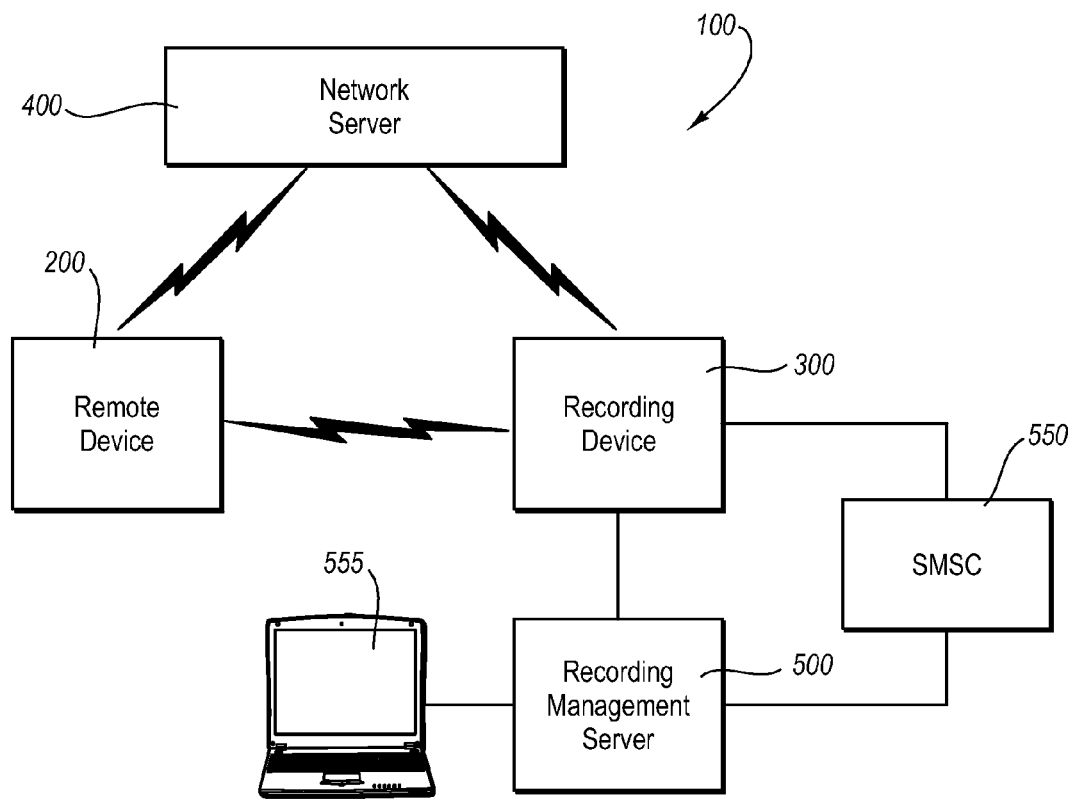
FIG. 1 is a schematic view illustrating aspects of an exemplary operating environment for embodiments of the invention.

With particular attention now to FIG. 1, one exemplary implementation of an operating environment, specifically, a wireless telephone network denoted generally at 100, is indicated. Although this exemplary operating environment comprises a wireless telephone network, it should be understood that the scope of the invention is not so limited. Rather, embodiments of the invention may be employed in connection with any other type of network and associated devices that are effective in implementing or facilitating wireless communication or landline communication between two or more devices. Accordingly, the scope of the invention should not be construed to be limited to the exemplary operating environment indicated in FIG. 1.

In the exemplary illustrated embodiment, the wireless network 100 includes a wireless communication device of a caller, designated as remote device 200, configured to communicate with a wireless communication device of a telephone call recipient who wishes to record the telephone call, designated as recording device 300. Both the remote device 200 and the recording device 300 are configured to communicate with a network server 400 associated with the wireless telephone network 100.

As discussed in further detail below, the network server 400 may be associated with provision of a service to the remote devices, such as location based services which track the geographical location of wireless devices. Network server 400 could also be a Home Location Register (HLR) or Visiting Location Register (VLR) which may be employed in conjunction with the invention to determine the location of the parties to a communication session. Additionally, network server 400 could be an element of the 911 emergency system, which has location determination capabilities. Generally, network server 400 is able to obtain and provide various information concerning the location, status and operations of the remote device 200 and/or recording device 300 in connection with the wireless telephone network 100.

As further indicated in FIG. 1, at least the recording device 300 is configured to communicate with a recording management server 500 that may be embodied, in one implementation, as a server operating within wireless network 100. In addition, FIG. 1 illustrates that recording management server 500 can communicate with a short message service center 550 and a remote computer 555, as described further below.

It should be noted both with respect to the remote device 200 and the recording device 300, that such devices refer in the most general sense to devices that, respectively, are able to at least transmit and/or receive wireless communications such as, but not limited to, voice data embodied in the form of wireless communications. Such voice data may comprise, for example, an entire conversation, or a portion of a conversation. Further, the terms "remote device" and "recording device" are used herein as a matter of convenience and are not intended to imply a limit to the scope of the functionality of either device. Remote device 200 and recording device 300 are typically wireless telephones or telephony-enabled wireless communication devices such as PDAs or smartphones. As noted elsewhere herein, however, the disclosed functionality may alternatively be implemented in connection with arrangements where either the remote device 200 or recording device 300 comprises a landline device.

Figure 2:
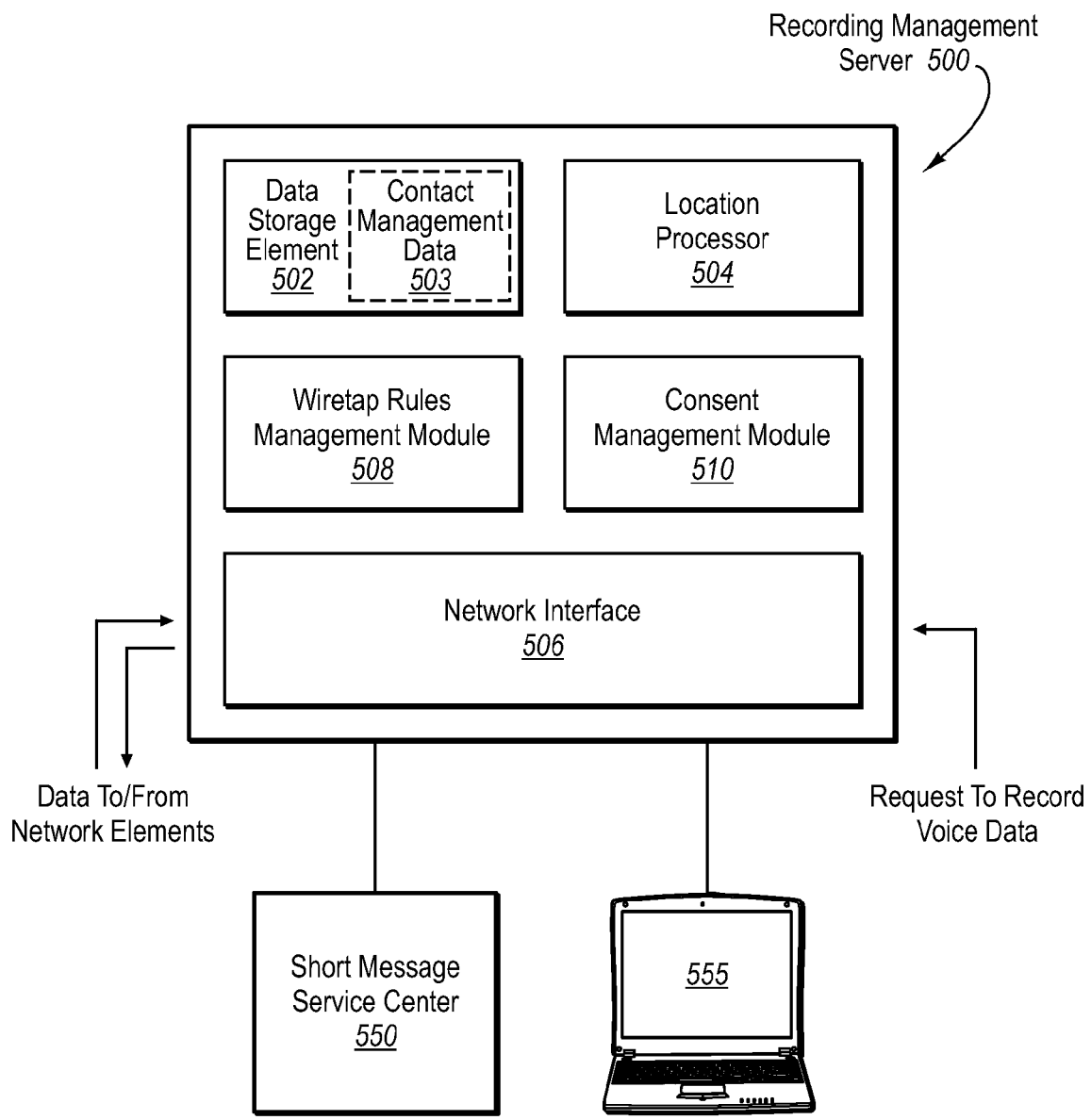
FIG. 2 is a schematic view illustrating aspects of a recording management server.

Directing attention now to FIG. 2, details are provided concerning an example of a recording management server 500. Recording management server 500 operates in conjunction with one or more recording devices 300 and may be implemented as a network element within the service provider network or as a hosted server that communicates with one or more network elements, such as network server 400, within the service provider network. Recording management server 500 includes a data storage element 502 for storing recorded voice data and associated consent. Data storage element 502 may also include contact management data 503 for recording device 300 which can be accessed by consent management module 510 to perform consent management functions.

Location processor 504 receives requests from recording device 300 to record voice data from a communication session. The request from recording device 300 is sent to network interface 506 using a mobile originated short message service message (MO-SMS) or any other suitable messaging or data transmission mechanism. Network interface 506 passes the request to location processor 504 which then attempts to determine the location of the recording device and the associated remote device(s). In certain configurations where consent is received prior to the recording device 300 initiating a call, the location processor 504 may not be required.

In an alternative embodiment, recording device 300 may request location information directly from one or more remote devices, and the remote devices may report their location directly back to recording device 300 using the aforementioned SMS messaging techniques or other data transmission techniques. Methods for locating the devices may include employing various positioning techniques such as those provided by global positioning systems or network based positioning systems that typically rely on triangulation of the signal from cell sites serving a wireless device. As such, the serving cell site can be used as a fix for location of the user. Depending upon the configuration of the wireless devices, recording management server 500 can obtain the device location information from a GPS server, or from an HLR, a VLR or another network element that tracks the location of devices.

Additionally, recording management server 500 may obtain information from a a switch or a router in the network or from a network element of the 911 system, for example, to identify the geographical location of a party using a landline communication device, such as a landline telephone. For example, if a remote party has forwarded all telephone calls from his wireless device to a landline device on a circuit-switched network, the terminating switch is determinant of the landline device location, and the recording management server may determine the location information of this remote party from the location of the switch.

Furthermore, wiretap rules management module 508 maintains the rules and requirements for each jurisdiction having associated wiretap laws and receives input from location processor 504 concerning the geographical location of the parties to the communication session. Once received, the geographical locations are correlated with the jurisdictions corresponding to the geographical locations, processed in the rules management system and the requirements for lawfully recording the voice data are determined. The consent management module 510 then uses the location information, and other pertinent information, to determine whether consent of the non-recording party is required, or at least advisable.

In some situations, consent management module 510 may be initiated before location information is obtained and jurisdictional rules are applied. For example, consent management module 510 also accesses contact management data 503 to determine whether prior consent of participants on a call has already been obtained. Depending on the scope of the consent granted or not granted, location processor 504 and wiretap rules management module 508 may then be executed to obtain the information necessary in order to determine whether a call can be recorded. Further details concerning consent management processes are provided below in connection with the discussion of FIGS. 10A through 13.

Recording management server 500 may further interface with a Short Message Service Center (SMSC) 550 in order to exchange short message service (SMS) messages with recording device 300 and with other network elements, such as various location positioning systems. Such SMS messages may contain recording management system commands such as a request to record, or location information or other information that directs the behavior of the recording management system.

Finally, a remote computer 555 can communicate with recording management server 500 to allow a user to access past recorded conversations, to manage contact management data 503, to manage recorder device preferences, and the like.

Figure 3:
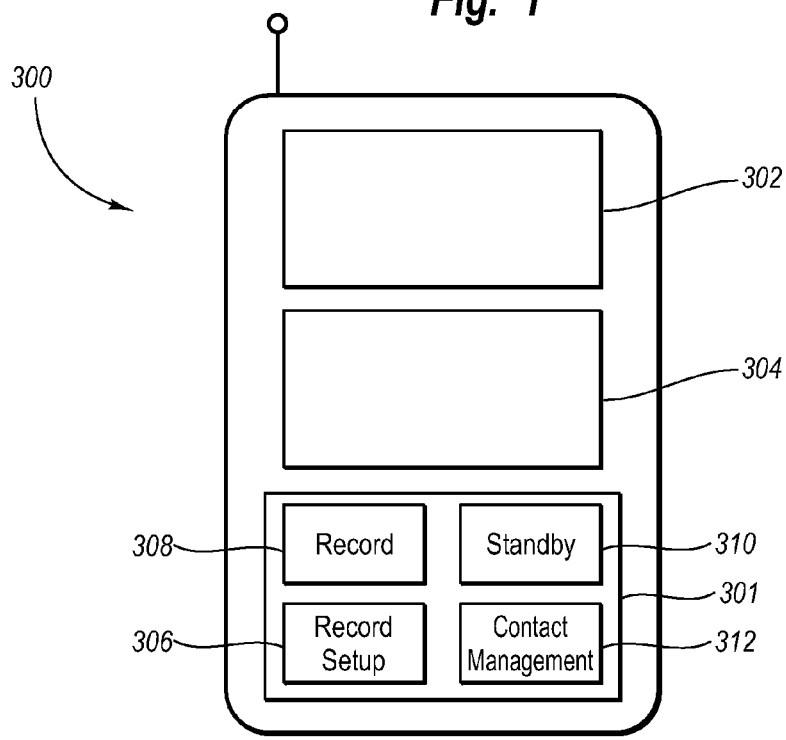
FIG. 3 is a schematic view of an exemplary implementation of a wireless communication device that provides a suitable operating environment for recording management client software.

Directing attention now to FIG. 3, further details are provided concerning an exemplary implementation of the recording device 300. In some implementations, the remote device 200 may be similar or identical to the recording device 300 in terms of structure and/or functionality. Accordingly, the following discussion is germane to at least some implementations of the remote device 200 as well.

The illustrated embodiment of the recording device 300 includes various features typical of wireless communication devices such as mobile telephones and radios including, for example, a display 302 and a keypad 304. Additionally, the recording device 300 may include other features typical of such wireless communication devices, such as, not limited to, menu navigation keys, redial keys, input and output connections and an on/off switch (not shown). In addition to these typical features, the illustrated embodiment of the recording device 300 further includes recording management client software 301 which implements recording functions such as RECORD SETUP 306, RECORD 308, STANDBY 310, and CONTACT MANAGEMENT MODULE 312.

In some cases, recording functionality may be accessed and manipulated by the user of the recording device. For example, a recording party may request that voice data be recorded on a call by call basis, which requires intervention by the recording party to set up the recording session. In other cases, the recording functionality occurs as a background process not accessible by the user. For example, a recording device may be pre-programmed to always record the voice data received from a particular remote device. Recording functionality that is accessible by the user can be implemented using physical buttons on a keypad, soft buttons on a graphical user interface, spoken commands or other user interface elements that enable the user to select the corresponding operations.

As disclosed in further detail herein, RECORD SETUP 306 generally allows a user to request a recording session on demand and to specify various criteria to be used in making determinations as to the recording and other handling of a telephone conversation conducted in connection with the recording device 300. More specifically, the RECORD SETUP function manages the request of the recording party to record voice data, and sends the request to network interface 506 of recording management server 500. In another implementation, the request is sent directly to the remote device in order to determine its location.

As part of the RECORD SETUP function, recording management client software 301 receives and processes consent from remote parties, either by recording spoken consent from the remote party or by receiving signals from the remote device, such as one or more dual tone multi frequency (DTMF) signals or "touch tones" which are indicative of consent. Additional details regarding the manner in which consent of the other party in the conversation can be obtained and documented, if necessary, is disclosed elsewhere herein.

In some implementations of the invention, RECORD SETUP 306 is used to preconfigure voice data recording criteria that may not be configurable by the user so that only select aspects of the record process can be determined by the user of the recording device 300.

In other situations, the user may employ RECORD SETUP 306 to specify preferences for automatically recording voice data received from particular devices without having to go through the location determination process. In some situations, the user may desire to store consent configurations either before or after a call with regard to one or more contacts in order to be able to record future calls with those contacts. RECORD SETUP 306 may communicate with a contact management module 312 to access and modify contact information for one or more contacts identifying the scope of consent that a particular contact has given to record conversations. In one embodiment, the contact management module 312 can access contact management data 503 stored at recording management server 500. However, in another embodiment, the contact management data can be stored locally at the recording device 300. Generally, the particular functionalities that are implemented in connection with the RECORD SETUP 306 function may be varied as necessary to suit a particular application or requirement.

The same is generally true with respect to the RECORD 308 function. That is, a variety of different record modes, and aspects of such record modes, may be defined in connection with use of the RECORD 308 function. Exemplarily, such record modes may be accessed and activated by way of a menu displayed by the recording device. As in the case of the RECORD SETUP functionalities, some or all of the various RECORD modes may be predefined or may alternatively be defined by the user. More generally, the various RECORD modes, as well as the way in which they are defined, may be selected as necessary to suit the requirements of a particular application. Accordingly, with respect to both the RECORD SETUP and RECORD functionalities, the scope of the invention should not be construed to be limited to any particular group or combination of functionalities. Rather, the groups and combinations of functionalities disclosed herein are exemplary only.

With continuing reference to FIG. 3, STANDBY 310 generally allows the user to exit any RECORD mode at any time so that any recording then in progress will cease. Moreover, no further conversations will be recorded while the recording device 300 is in the STANDBY mode.

Figure 4:
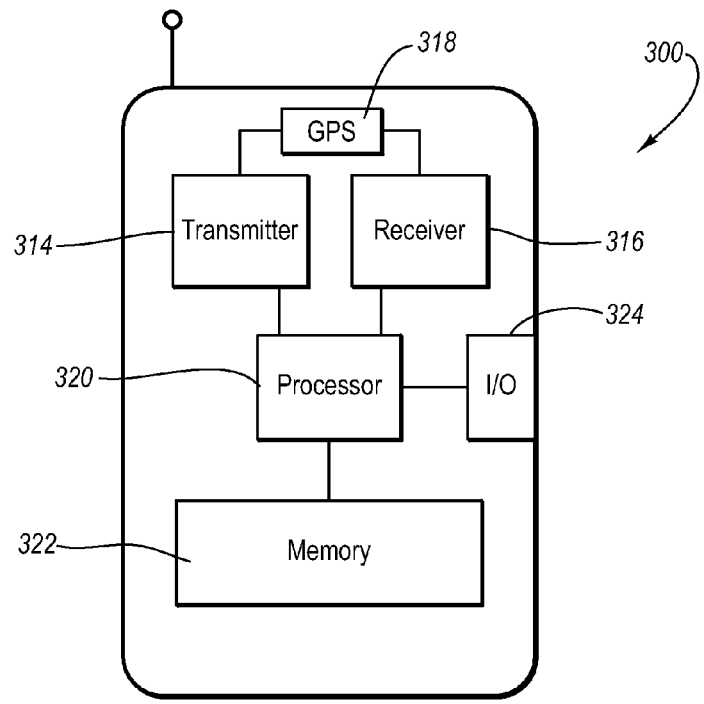
FIG. 4 is a schematic view of an exemplary implementation of a wireless communication device with the top cover removed to show various components and their relationship to each other.

With attention now to FIG. 4, a brief description is provided concerning various components of an exemplary implementation of a recording device 300. In the illustrated embodiment, the recording device 300 is equipped to communicate with wireless network 100 (FIG. 1). Recording device 300 further includes a transmitter 314 and receiver 316 that operate, or are configured to operate in connection with, a global positioning system ("GPS") module 318. Recording device 300 may also be equipped to communicate with and report to a location-based service that tracks the geographical location of the device. A processor 320 is also provided that is configured for communication with the transmitter 314 and the receiver 316, as well as with a memory 322 and an input/output ("I/O") device 324.

II. Recording Functionalities

Figure 5:
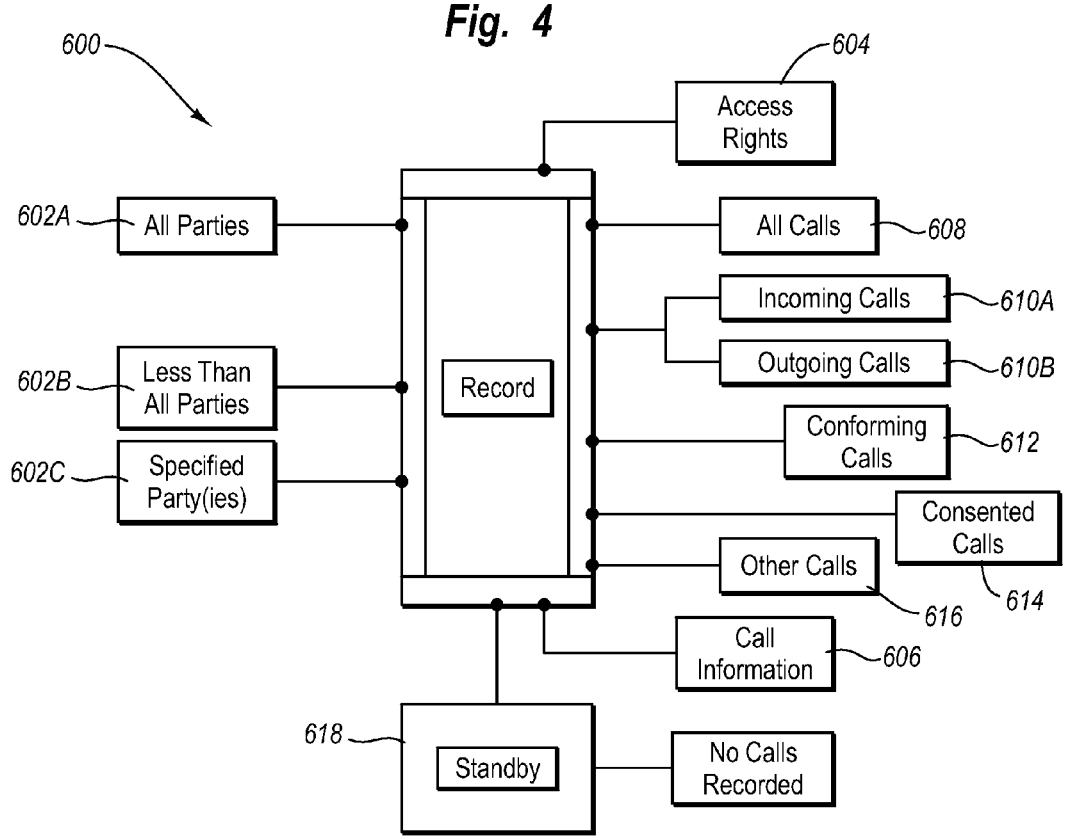
FIG. 5 is a conceptual depiction indicating examples of variables that may affect the recording of telephone conversations.

Turning now to FIG. 5, attention is directed to a conceptual depiction 600 of various considerations that may affect recording processes contemplated or performed in connection with embodiments of the invention. In at least some implementations, some or all of such considerations may be defined and implemented in connection with RECORD SETUP 306 such as was discussed earlier in connection with FIG. 3.

As indicated in FIG. 5, one element of recording processes concerns the party involved in the conversation which has been recorded, or which is being considered to be recorded. For example, some recording processes may be set up and configured so that the transmissions of all parties to the conversation are recorded, as indicated at 602A. In other implementations, recording procedures and processes may be defined at 602B where the transmissions of less than all of the parties to a particular conversation are recorded. For example, in a two party conversation, it may be desirable, or necessary, that only the transmissions of one party be recorded. Finally, as indicated at 602C, some recordings may be configured and arranged so that only transmissions from specified parties are recorded. As discussed in further detail below, the parameters indicated at 602A through 602C may be specified for use in connection with a single call, groups of calls, or for all calls.

Figure 8:
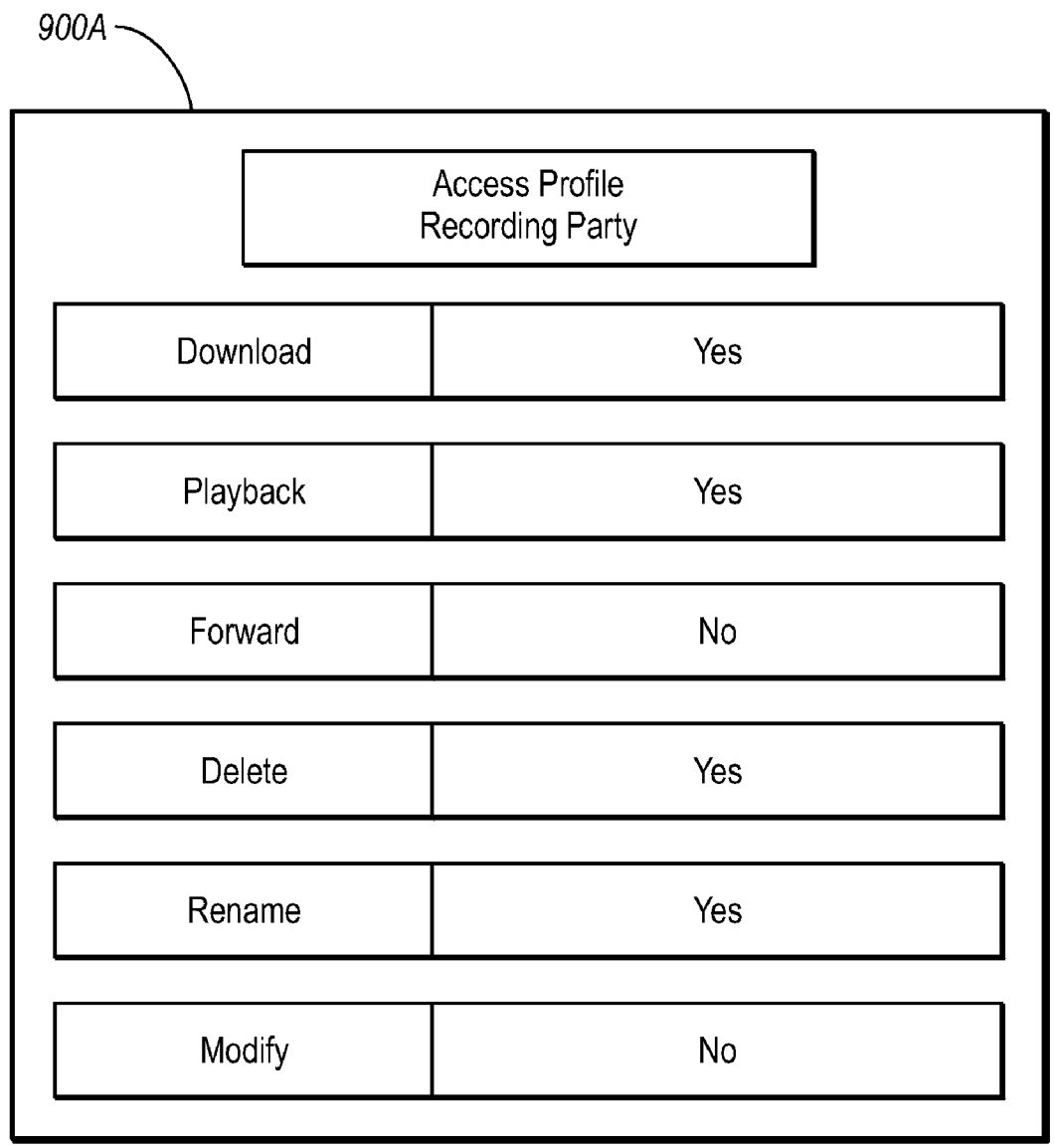
FIG. 8 illustrates aspects of an exemplary access profile such as may be constructed with respect to the rights and privileges of a recording party with respect to a recorded conversation.

With continuing reference to FIG. 5, various access rights 604 may likewise affect whether, when and how to record a conversation or portion thereof Further details concerning aspects of such access rights 604 are discussed below in connection with FIGS. 6, 8 and 9. In connection with the performance of recordings, other related information may be recorded as well. For example, in some implementations of the invention, call information 606 such as the date and time of the call, and the duration of the call, may likewise be recorded.

As suggested in FIG. 5, the various factors used to guide decisions as to whether and how to record the voice data of a telephone conversation can be defined, combined, and employed in various ways so as to target particular types or groups of calls and/or particular parties or groups of parties. For example, as indicated at 608, embodiments of the invention may be defined and configured so that all calls to a particular device are recorded.

In other cases, embodiments of the invention may be configured so that recording decisions are made with reference to whether or not the call is an incoming call 610A or an outgoing call 610B. For example, it may be specified that only incoming calls 610A are to be recorded or that only outgoing calls 610B are to be recorded. Additionally, the user may desire to record only those calls, or conforming calls 612, that conform to or satisfy a predetermined set of criteria.

Further, decisions as to whether or not to record telephone conversations may be made with reference to whether the parties to the conversation have consented to having the call recorded, that is, whether the call is a consented call 614. As discussed in further detail below, consent codes may be defined and employed in this regard when all participating devices are enabled with the recording management client software. Alternatively, if a party does not have a device that is thus enabled, spoken consent may be recorded by the recording party and associated with the recorded voice data. Of course, a variety of other calls, denoted generally at 616, may also be defined and identified as candidates for recording and subsequent use.

By way of example, some implementations of the invention provide that only consented telephone calls 614 from specified parties 602C will be recorded. As another example, the recording configuration may be specified such that only incoming calls 610A that comprise consented calls 614 will be recorded. In yet another example, the recording configuration may specify that all calls 608 for all parties 602A be recorded even without consent, and then consent obtained later.

Finally, as indicated in FIG. 5, a STANDBY mode 618 is also defined in connection with exemplary embodiments of the invention. In the STANDBY mode 618, no calls are recorded. In other implementations of the invention, the STANDBY mode 618 may be defined and implemented such that only consented portions of calls are recorded. In one example of such an implementation, only the transmissions of the recording party are a recorded.

III. Recording Relationships

Figures 6, 7:
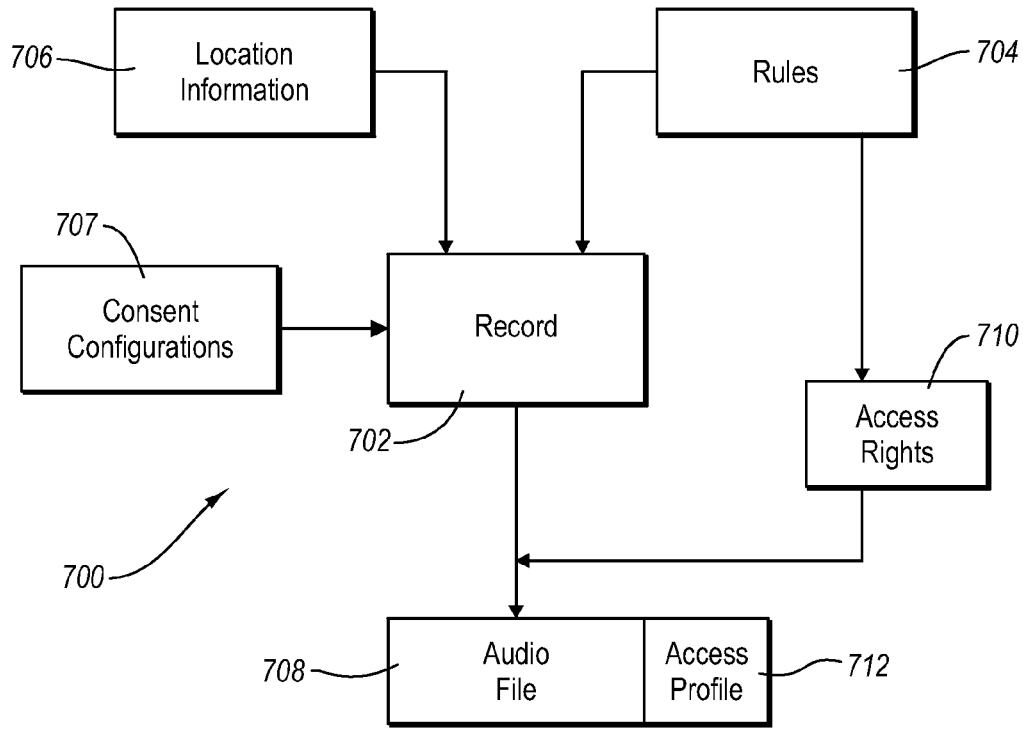
FIG. 6 is a schematic view illustrating relationships between various elements of an exemplary implementation of a recording management system.
FIG. 7 is an exemplary table of recording rules such as may be constructed to identify recording actions to be taken consistent with the wiretap laws of a particular jurisdiction.

Directing attention now to FIG. 6, details are provided concerning the relationships and interactions between various elements of a system and process 700 such as may be employed in the management of voice data transmissions.

As indicated in FIG. 6, a RECORD functional block 702 receives as inputs, various rules 704 and location information 706. In this implementation, the rules 704 enable or prevent, as applicable, various recording related activities, depending upon the geographical location of the remote device and/or recording device and/or the consent configurations 707 granted by the parties on the call. Moreover, exemplary implementations of the rules 704 also include or otherwise reflect built-in, or selectable, conflict resolution provisions. As well, exemplary rules 704 also inform the prospective recorder as to whether or not notification must, or should, be provided to the other party that the call will be recorded and/or is being recorded. Examples of such conflict resolution provisions are discussed in further detail below in connection with FIG. 7.

In one exemplary implementation then, if the location information 706 specifies that the recording device and the remote device are located in Arizona, and the rules 704 provide that the applicable Arizona wiretap statute allows conversations to be recorded if only one party consents to the recording, then the recording party may record the conversation, since the recording party consents to the recording, even if the remote party has not consented, or would likely not consent if duly informed. As this example illustrates, a party to a voice data communication can obtain geographic location information concerning the device used by the party and can then apply the pre-defined data recording rules 704 to make determinations such as whether and how recording of the conversation, or a portion thereof, may proceed. The geographical location information and the application of the rules are performed automatically to avoid the need for the party to have to be familiar with the applicable statutes.

In another exemplary implementation, consent configurations 707 may specify whether location information 706 must be obtained and corresponding rules 704 applied. For example, where all parties of a phone call have given prior consent to have a conversation recorded, it may not be necessary to invoke location information 706 and/or rules 704. However, in some situations, where less than all parties have given prior consent, it may be necessary to gather location information 706 about the parties and apply rules 704 to determine whether the conversation can be recorded.

In connection with the foregoing, it should be noted that implementations of the invention may be configured to provide various levels of control over the recording of voice data. For example, some implementations of the invention reflect a relatively passive approach to the recording and management of voice data in the sense that the user of the device with which any recording is to be performed is simply provided guidance, recommendations, and feedback as to desired recording operations. The user in such implementations is nonetheless free to undertake activities that may run counter to such guidance, recommendations, and feedback.

Yet other implementations of the invention reflect a relatively more active approach to the recording and management of voice data. In particular, such embodiments are not limited simply to providing guidance, recommendations, and feedback to the user as to contemplated recording operations. Rather, such implementations automatically employ varying degrees of control over recording processes so that, for example, some desired recording processes cannot be implemented by the user if application of the recording rules indicates that such recording processes are not permitted for some reason. In implementations such as these, the user is simply prevented from engaging in certain predefined activities.

With continuing reference now to FIG. 6, and as discussed in further detail below, the location information 706, rules 704 and/or consent configurations 707 may be correlated in a variety of other ways as well. Further, embodiments of the invention are not limited solely to the use of location information 706 in connection with decisions as to when, how and if a conversation may be recorded. In addition, embodiments of the invention may be configured so that location information is obtained immediately at the beginning of a call, during the call, or after the call has been completed. In some instances, the time at which the location information is obtained may be a function of the recording rules of a particular jurisdiction. Of course, various other factors may determine, as well, the time at which location information is obtained.

In any case, once a recording has been performed, an audio file 708 is created, which includes the recorded consent from any of the parties, if applicable. In alternative implementations, the recorded consent takes various other forms such as, for example, a recorded sequence of keystrokes that manifests consent to recording. At that time, various access rights 710 that are correlated with the rules 704 are used to develop an access profile 712 that is appended to, or otherwise associated with, the audio file 708. In general, the access profile 712 defines certain permitted, as well as prohibited, activities concerning the handling and management of the audio file 708.

As an example, if the rules 704 specify that recordings made in certain jurisdictions are only available for access by law enforcement officials, a corresponding access right 710 may be defined to that effect. While the corresponding access profile 712 is independent from electronic file 708, a relationship between the two is formed such that only law enforcement personnel with the specified access rights, such as may be reflected by an access code, will be able to manipulate the electronic file 708. Further details concerning examples of such access profiles are discussed below in connection with FIGS. 8 and 9.

IV. Recording Rules and Access Profiles

Directing attention now to FIG. 7, details are provided concerning an exemplary set of recording rules such as may be defined and implemented in connection with embodiments of the invention. The illustrated rules are not intended to limit the scope of the invention in any way and, more generally, various other recording rules, and combinations thereof, may likewise be defined and implemented.

As indicated in the recording rules table 800, four different cases, case I 802, case II 804, case III 806, and case IV 808 are defined in this exemplary implementation. In the exemplary recording rules table 800, J1 represents the jurisdiction where the recording device is located at the time of voice data transmission from the remote device, and J2 represents the jurisdiction where the remote device is located at the time of voice data transmission.

In case I 802, both J1 and J2 are single party consent jurisdictions, denoted as "SP" in recording rules table 800. That is, in such jurisdictions, the consent of only one party to the conversation is necessary for the conversation to be legally recorded. Thus, in exemplary case I 802, where both jurisdictions are single party consent jurisdictions, the conversation can be recorded without limitation. For example, the recording party can record transmissions from the remote party, without the consent of the remote party and without notifying the remote party that the transmissions are being recorded.

In case II 804, J1 is a single party consent jurisdiction but J2 is an all party consent jurisdiction where all parties to the conversation must give their consent before the conversation can be lawfully recorded, denoted as "AP" in recording rules table 800. In case II 804, the rule resolves this conflict by providing, as a default, that no recording should, or may, take place. This approach to the definition of the rule is conservatively biased in that such an approach errs on the side of the course of action called for by application of the law of J2, that is, recommending against, or prohibiting, the contemplated recording. Alternatively however, a less conservative bias can be reflected in the design of the rule such that the rule may be constructed to allow the recording, consistent with the application of the law of J1. It should be noted that these are exemplary conflict resolution approaches however, and the scope of the invention should not be construed to be limited simply to these examples. Further, some implementations of the invention enable the user to define and implement conflict resolution protocols.

In yet other cases, one or more rules may reflect a hybrid approach. For example, in the event of a conflict such as suggested by case II 804, the rule may be defined to provide that the recording can take place with certain limitations. Thus, such a rule may provide that the transmissions of the party in J1 can be recorded by that party, but the transmissions of the party in J2 cannot be recorded by the party in J1. Of course, various other approaches may likewise be devised and implemented.

With continuing reference to the exemplary recording rules table 800, case III 806 provides that J1 is an AP jurisdiction, while J2 is an SP jurisdiction. Thus, even though the party in J1 desires to record the transmissions of the party J2, and could do so under the rules of J2, the party in J1 is constrained by the rule of J1 which provides that both parties must consent and, since the consent of the second party has not been obtained, no recording can take place.

Finally, in exemplary case IV 808, both parties are located, during the course of the conversation, in AP jurisdictions where all parties must give consent prior to recording of a conversation or for a recorded conversation to be retained. As in cases II 804 and III 806, the default, based on the bias, is that no recording should take place. As in the other cases however, the rule may be designed to reflect a less conservative bias, or may alternatively specify that the recording may take place but with certain limitations.

While conflict resolution schemes such as those examples outlined herein are well-suited for use in connection with two party calls, such schemes may be readily adapted to situations where there are three or more parties to a call. Accordingly, the scope of the invention should not be construed to be limited for use in connection with two party calls. Rather, embodiments of the invention may be employed in connection with voice data transmissions that involve any number of parties.

Consistent with the foregoing, the actions specified by the various recording rules relate to various wiretap statutes of particular jurisdictions. Because such statutes may change from time to time, exemplary embodiments of the invention are configured to receive, such as from a website, and incorporate updated statutory information when such information becomes available. Thus, the various recording rules can be reevaluated and redefined, if necessary, to remain consistent with the updated statutory information.

As indicated earlier, recorded conversations may, in some implementations, have associated therewith an access profile 712 (see, e.g., FIG. 5) that specifies the scope and a type of access that particular individuals or parties may have with respect to the associated recorded conversation. Directing attention now to FIG. 8, one example of an access profile, denoted generally at 900A, is indicated that specifies the rights of a party that made the recording. As noted earlier, such rights may be defined with reference to various rules that have been defined in connection with the recording. In the illustrated example, the recording party is permitted to download, playback, delete and rename the recording, but is not permitted to forward the recording to another party or to modify the recording.

Thus, once the access profile 900A has been associated with the recording, the recording party may only perform the indicated actions with respect to the recording. In some implementations, the exemplary access profile 900A, or any other access profile, is associated with the recording by the recording management client software (see, e.g., FIG. 3) while, in other cases, the recording is uploaded from the recording device to the recording management server which then associates the access profile with the recording. In the latter instance, the recording party may be prohibited from performing any activity concerning the recording except the upload process or, alternatively, the recording may be uploaded automatically and then deleted from the memory of the recording party device, without necessitating any further action by the recording party.

Figure 9:
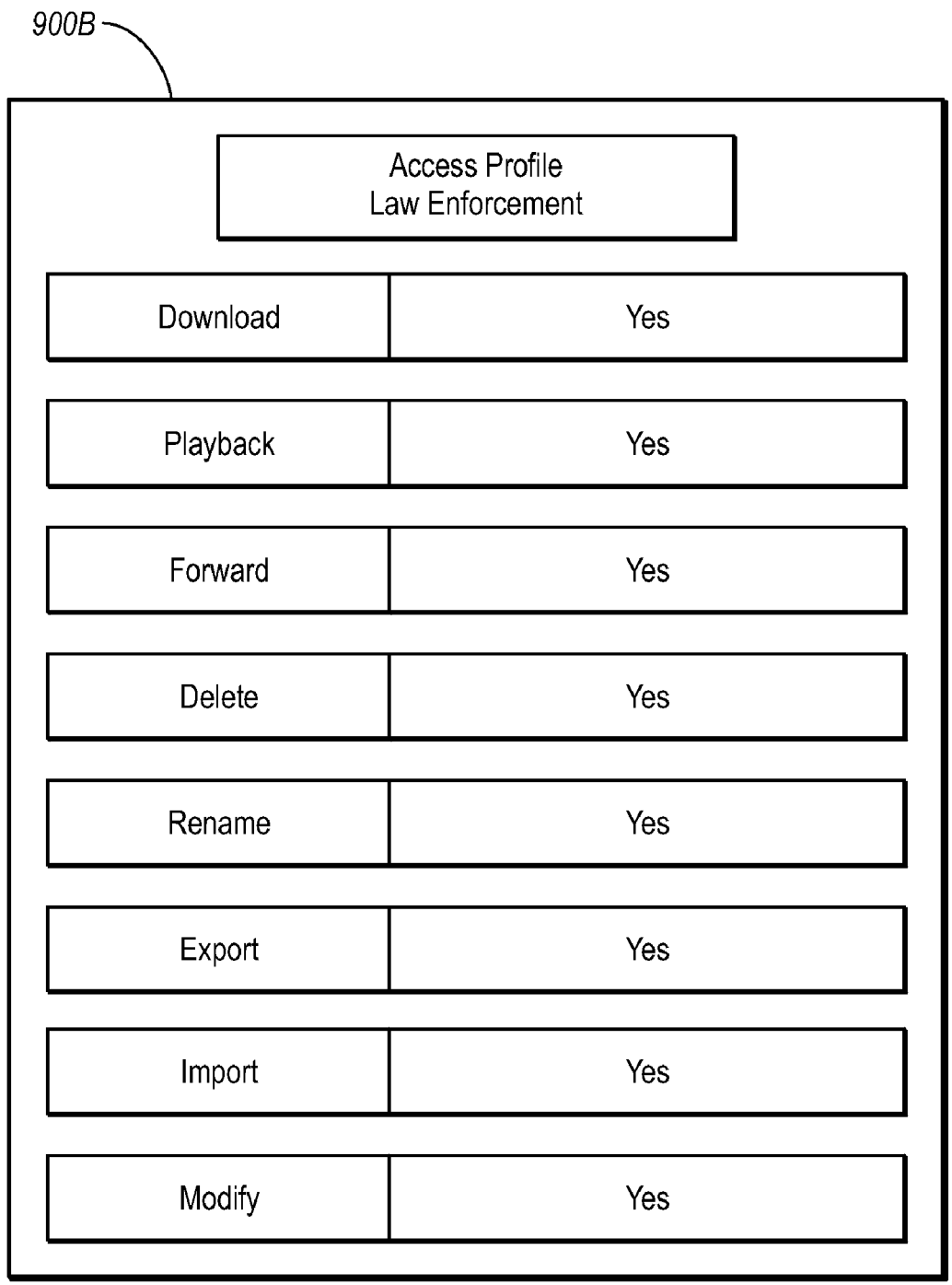
FIG. 9 illustrates aspects of an exemplary access profile such as may be constructed with respect to the rights and privileges of a law enforcement official with respect to a recorded conversation.

Another example of an access profile that may be defined and used in connection with embodiments of the invention is a law enforcement access profile, denoted at 900B in FIG. 9. As indicated there, a law enforcement official with the proper access code has substantial rights with respect to the recording. In this example, the law enforcement official is permitted to download, playback, forward, delete, rename, export, import and modify the recording.

Of course, various other types of access profiles may likewise be defined. For example, the network server 400 may be entitled to some level of access with respect to recordings obtained by way of wireless telephone network 100. For example, the network server may be permitted to download and save recordings.

In yet other implementations, multiple access profiles, such as an access profile for the recording party and an access profile for law enforcement, may be associated with a single recording. Alternatively, the access profile may be constructed so as to specify the rights and permission of multiple parties with respect to a single recording. More generally, a variety of safeguards may be employed to protect the integrity of the recording and the rights of the various parties involved.

As shown in FIGS. 1 and 2, a party may access an audio file remotely from, for example, a client computer 555. For example, a party may perform secure authentication logon to remote management server 500 that then allows a party to access the audio file, depending on the access profile for the authenticated user.

V. Recording Processes

With attention now to FIG. 10, a process 1000 is illustrated that is concerned with the recording of a call in the context of the wireless network 100 where the recording device explicitly asks the recording party whether to record the call for every telephone conversation. As mentioned above, the recording rules can be implemented more or less conservatively and, in the present invention, take into account various methods for obtaining necessary consents. At stage 1001 of this exemplary process 1000, the user either receives or initiates a call from, or with, another party in connection with the wireless telephone network 100.

At 1002, immediately before or after the connection has been made between the two or more parties, the system sends a consent inquiry to the recording device user to determine whether the recording device user want to record that particular conversation and/or future conversations with the particular identified remote device users. The consent inquiry can be sent in the form of a visual or audio message. At 1003, the system determines whether consent was received from the recording party. If consent is not received, the recording does not occur.

However, if consent is received, at 1004, the system sends a consent inquiry to all of the remote device users involved in the telephone call to determine whether each of the remote device users want to record that particular conversation and/or future conversations with the identified recording device user. Again, the consent inquiry can be sent in the form of a visual or audio message. At 1005, the system determines whether consent was received from each of the remote device users. If consent is not received, additional steps can be taken to determine whether or not recording of the conversation can occur.

If all of the remote device users agree, this means that all participants in the conversation have consented to having the conversation recorded. Optionally, as shown at stage 1006, if all of the participants in the conversation agree to recording this and future conversations, the recording device and/or remote management system updates consent configurations relating to the participants of the conversation indicating that consent has been obtained to record conversations between these particular participants. In addition, if all participants agree to recording of this conversation, the process proceeds to stage 1012 to record the conversation, eliminating some of the steps that may otherwise be required to determine whether to record a conversation if less than all of the participants do not agree to record the conversation.

Users may indicate consent to recording a call using, for example, data input via the keypad of their device, e.g., selecting YES or NO soft buttons on the device or other recorded sequence of keystrokes that manifests consent to recording, audio input, e.g., saying the words "yes" or "no" audibly so that their response can be recorded by a device, and/or tonal input, e.g., using numeric keys, such as "1" for "yes" and "2" for "no" or other recorded sequence of tonal input that manifests consent to recording which can be detected using DTMF tone technology. These methods for obtaining consent, even between users having telephone devices that do not implement the present technology are discussed in detail in co-pending U.S. patent application Ser. No. 10/969,487, filed Oct. 20, 2004, and entitled "Systems and Methods for Criteria-Based Recording of Voice Data," which application is incorporated herein by reference in its entirety.

As mentioned, if less than all the participants agree to the recording, than it may be necessary to obtain other information that will be useful in determining whether to record and/or allow access to a recorded conversation based on the present conversation. At 1007, the system obtains jurisdiction information for each participant in the telephone call, which exemplary can be performed using systems and methods described in further detail in co-pending U.S. patent application Ser. No. 10/969,487, filed Oct. 20, 2004, and entitled "Systems and Methods for Criteria-Based Recording of Voice Data," which application is incorporated herein by reference in its entirety. After the jurisdiction information has been obtained in stage 1007, the process 1000 advances to stage 1008 where the recording device accesses the recording rules. At stage 1010, the jurisdiction information that has been received is correlated with the recording rules and the process 1000 then advances to stage 1012 where the conversation is recorded or otherwise processed in accordance with the applicable recording rules.

After the conversation has been recorded at stage 1012, the applicable access profile, or profiles, are then associated with the recording at stage 1014 and the recording is stored at stage 1016. Subsequent to storage, the process 1000 advances to stage 1018 where the recording may be accessed and otherwise manipulated in accordance with the associated access profiles. As noted earlier herein, the access profile may be attached by the recording device, or after the recording has been uploaded from such device, by recording management server 500 (see, e.g., FIG. 1). Thus, as in the case of the recording rules, the access profiles can be stored on the remote device, the recording device, at the recording management server 500, or elsewhere on the network.

Thus, method 1000 provides a method for overriding pre-configured recording rules by obtaining consent from all the parties to the call so that the call can be recorded. As noted earlier, various jurisdictions implicate different sets of wiretap laws, and most jurisdictions provide that where all parties consent to the call being recorded, the recording of the call is lawful. In situations where all parties consent, this can advantageously eliminate stages 1007, 1008 and 1010, preserving system resources. In addition, by providing all parties the opportunity to consent in advance to future recordings, this information can additionally reduce time and effort to obtain recorded conversations in the future.

Figure 10A:
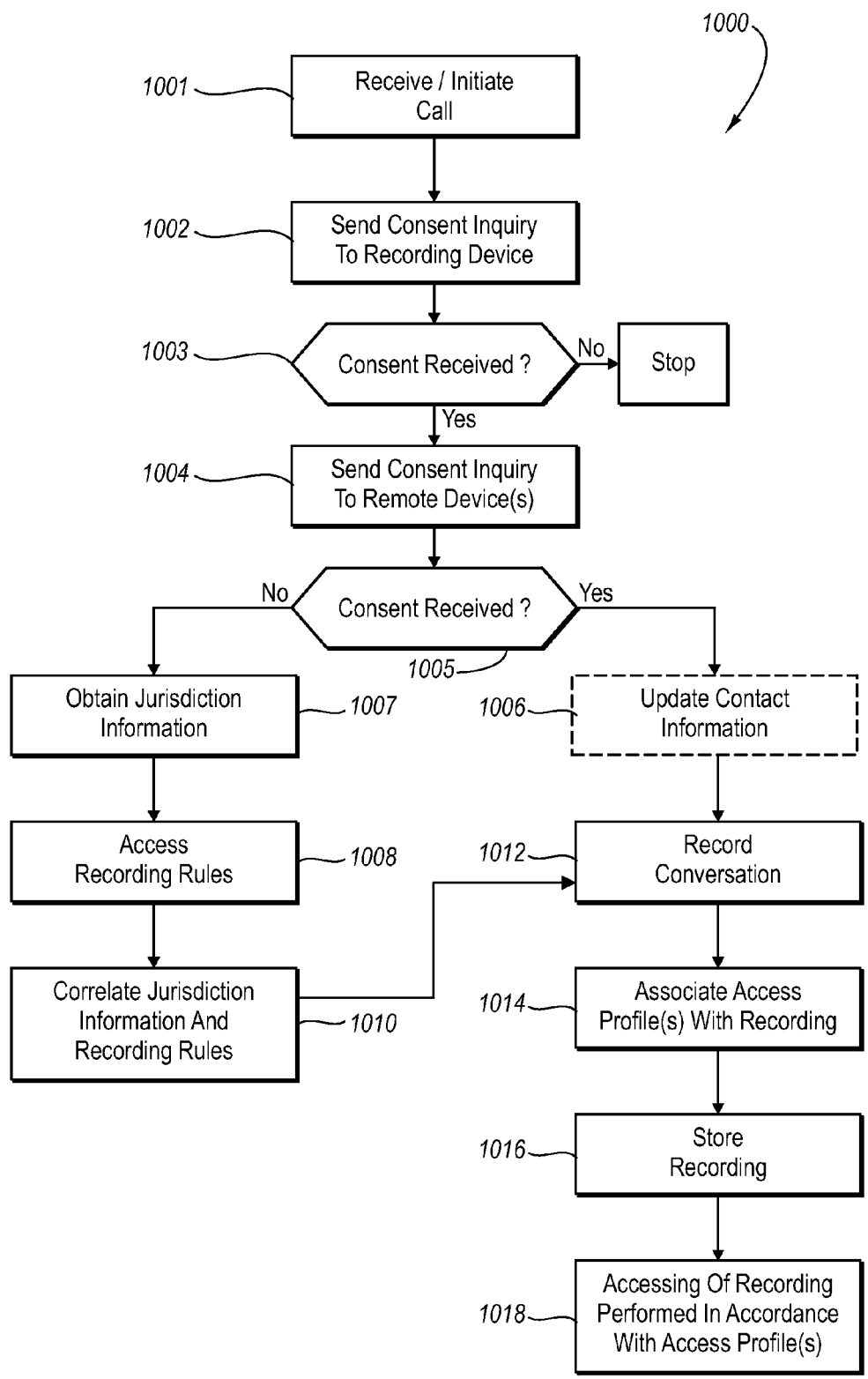
FIG. 10A is a flow chart illustrating aspects of a process for requesting, obtaining and managing consent to record a conversation at the beginning of a conversation.
Figure 10B:
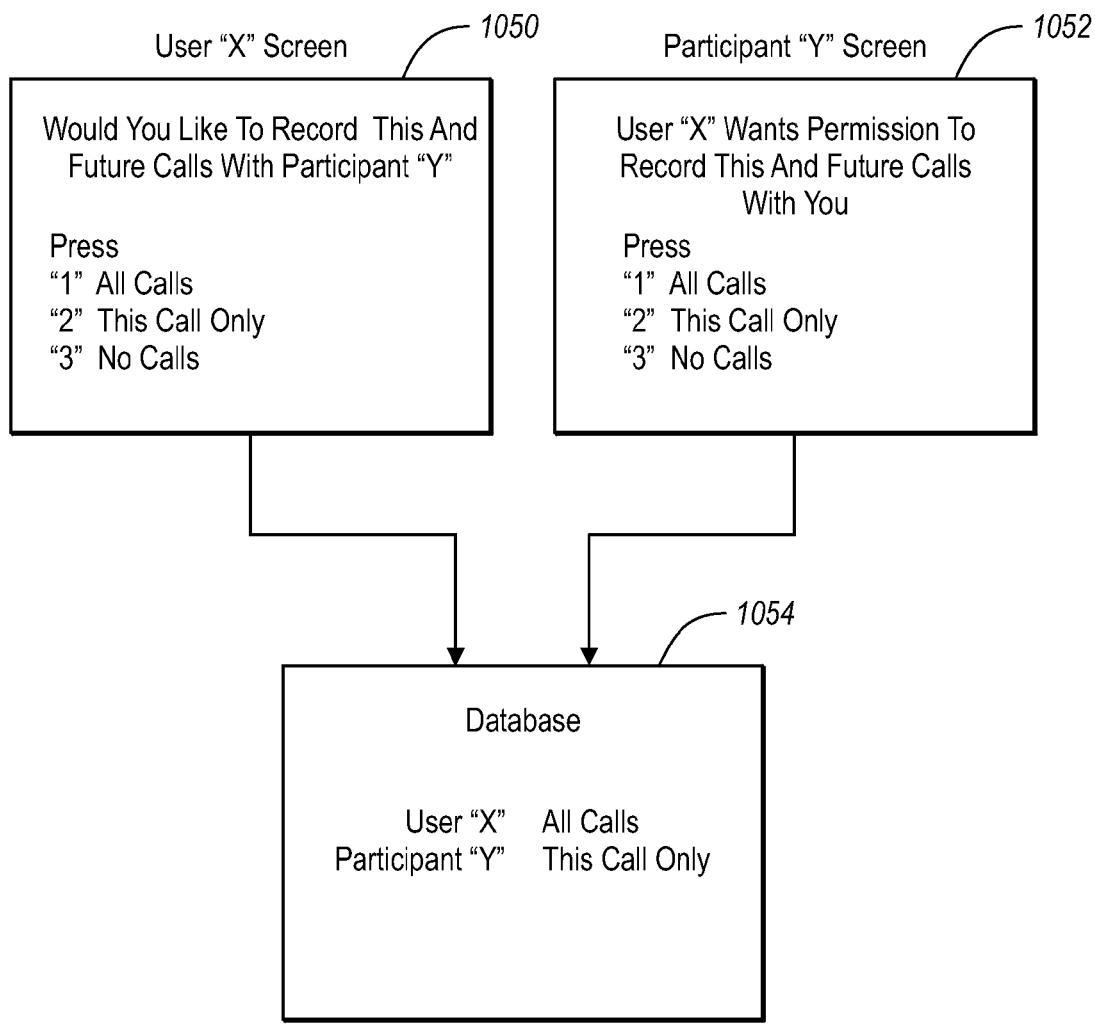
FIG. 10B is block diagram illustrating obtaining consent before commencing a conversation.

FIG. 10B illustrates exemplary visual messages that can appear on the display screen of the recording device and the remote device containing recording inquiries. Block 1050 is an example of a popup window that can appear on the display of the recording device for User X. Block 1050 displays the following text "Would you like to record this and future calls?" Block 1050 then indicates that the user should press "1" for "all calls," "2" for "this call only", or "3" for "no calls."

If User X selects "3" for "no calls," then a consent inquiry is not sent to the participant. However, if the User X selects "1" or "2," a consent inquiry is sent to the remote device. Block 1052 is an example of a popup window that can appear on the display of the remote device for Participant Y. The screen can display the following text, "User X wants permission to record this and future calls." The block 1052 then indicates that the participant should press "1" for "all calls," "2" for "this call only", or "3" for "no calls."

FIG. 10B also illustrates that the input received from User X and Participant Y is sent to update a database entry to define a consent configuration between User X and Participant Y. Block 1054 exemplarily shows that User X has selected all calls with Participant Y to be recorded, but that Participant Y has selected this call only to be recorded. It will be appreciated that other variations of user and participant input may apply and that a group (i.e., more than two individuals) can have a consent configurations associated with the group.

The database storage element 502 can store the consent configurations such associating the consent information with contact management data 503. It will be appreciated that the data storage for storing the consent configurations can be configured in various ways, such as in a list structure. The consent configurations can be sorted into an "always record" list, a "sometimes record" list, and a "never record" list. In one embodiment, all the contacts in a contact management database can start with a default consent configurations as "never record." When the user of the recording device and any contact in the user's database makes any changes to a consent configuration, the contact management database is updated accordingly.

For an audio version for obtaining consent from a conversation participant, the following participant may hear the following dialogue:

[Name of Sender] is calling you. This call may be recorded. Do you agree to have this conversation recorded? Please say "Yes" or "No".

[Participant Indicates:]
Yes
No

[If recipient indicates YES] To save you from having to listen to this message in the future, you can agree to have all future conversations with [Name of Sender] recorded?

[Participant Indicates:]
Always
Never
Only record this conversation

[If recipient indicates ALWAYS During recorded conversation, you usually hear a beep every ten seconds. Would you like to delete the beep?

[Participant indicates:]
Yes
No

Figure 11A:
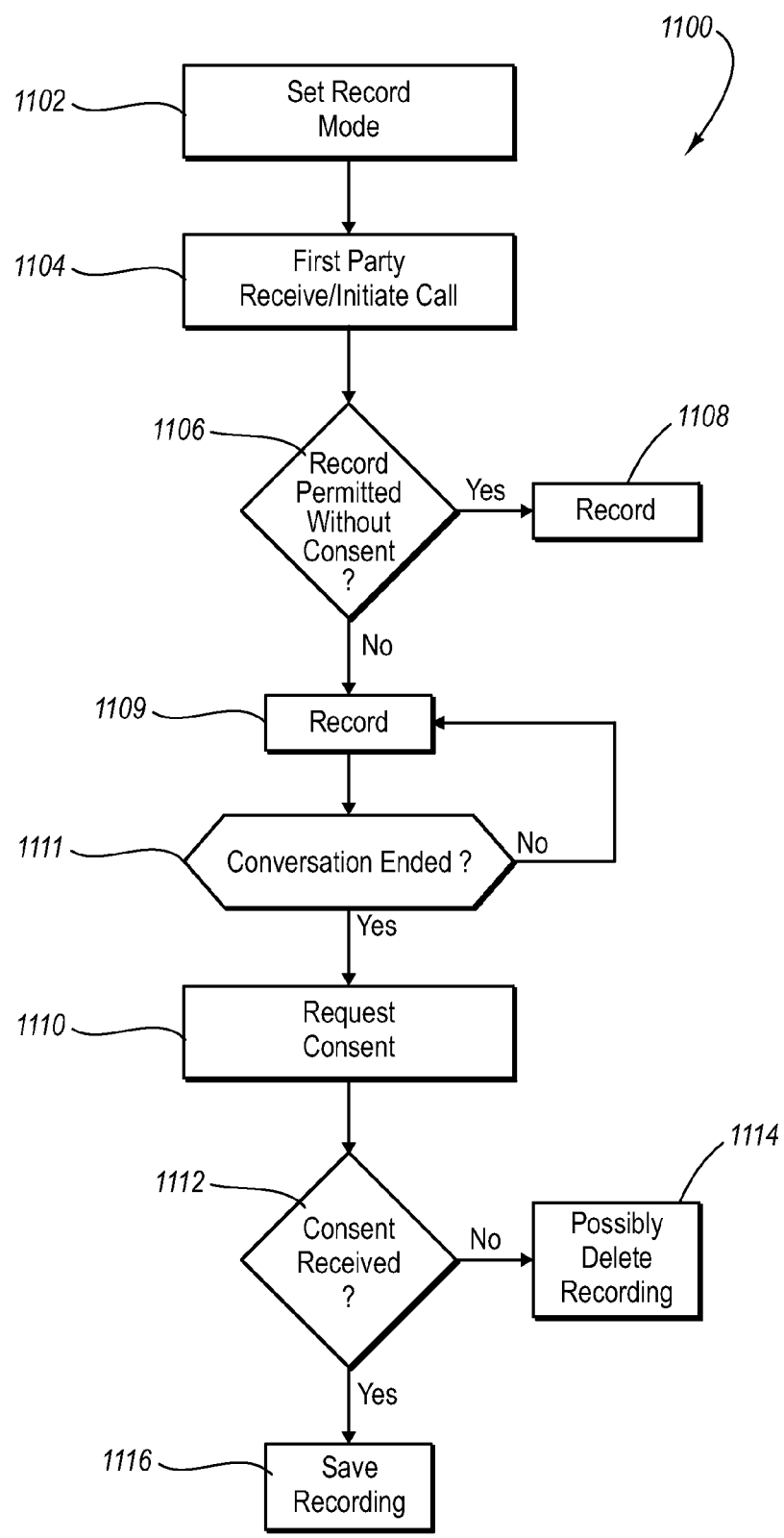
FIG. 11A is a flow chart illustrating aspects of a process for requesting, obtaining and managing consent to record a conversation at the end of a conversation.

FIG. 11A depicts an alternative embodiment where recording occurs first and then, if necessary, permission is obtained at the end of the conversation. As shown in FIG. 11A, the user sets the RECORD mode at stage 1102 and no further action takes place until stage 1104 where one party receives or initiates the call. Once the connection has been made, the process 1100 advances to decision point 1106 where a determination is made, with reference to the recording rules and jurisdiction information, as to whether the conversation may lawfully be recorded without the consent of the non-recording party. If the conversation is permitted to be recorded, the process advances to stage 1108 where the conversation is recorded. Thus, certain conversation can be recorded without asking for permission from any party, such as may be permitted by laws that allow recording without notification for certain law enforcement or emergency response crews. In this case, after stage 1108, no notification is sent to any party.

If, on the other hand, the recording cannot be recorded legally without consent, at 1109, the system still continues to record the conversation without obtaining consent from the user of the remote device. The recording is kept in a data storage, such as a cache or other temporary storage. At 1111, the system determines whether the conversation has ended. In one embodiment, the system can detect that one of the participants has disconnected the call and prevent the call from completely disconnecting before consent notifications are sent. In another embodiment, the system can send consent notifications after the call is disconnected.

At stage 1110, after the call has completed, the system sends a consent inquiry requesting the consent of all parties on the call to record the conversation. After consent has been requested, the process advances to a decision point at stage 1112 where it is determined whether or not consent has been received from the party from whom consent was requested. In one implementation of the invention, the party or parties indicate consent by selecting one or more keys or soft keys, corresponding to a consent code, or by issuing a verbal command. If consent is received by the recording management system from all parties, the process advances to stage 1116 where the recorded conversation is stored.

If, on the other hand, consent is not received from the party from whom consent was requested, the process 1100 proceeds to stage 1114 where it is determined whether to possibly delete the recording, although the prospective recording party may still record its own transmissions. To determine whether to delete the recording, additional information may be obtains, such as jurisdictional information described in further detail in FIG. 10A. As discussed above, the jurisdictional information can be cross-referenced with any consent obtained and jurisdictional recording rules to determine whether to delete or save the recording. As such, it will be appreciated that additional stages may be added to method 1100 according to the teachings herein.

However, the method of FIG. 11A serves to illustrate that consent can be obtained after the telephone conversation has ended. Where a user (such as a financial broker), regularly obtains consents from all participants, this embodiment may be beneficial to reduce certain steps at the front end of the conversation. This embodiment can also be useful where, e.g., a user forgot to obtain consent at the beginning of the conversation and now wants to make sure that the conversation is recorded. In this case, the user can interact with the recording device during the course of the conversation to initiate the processes to obtain consent at the end of the conversation without interrupting a conversation in order to obtain consent.

Figure 11B:
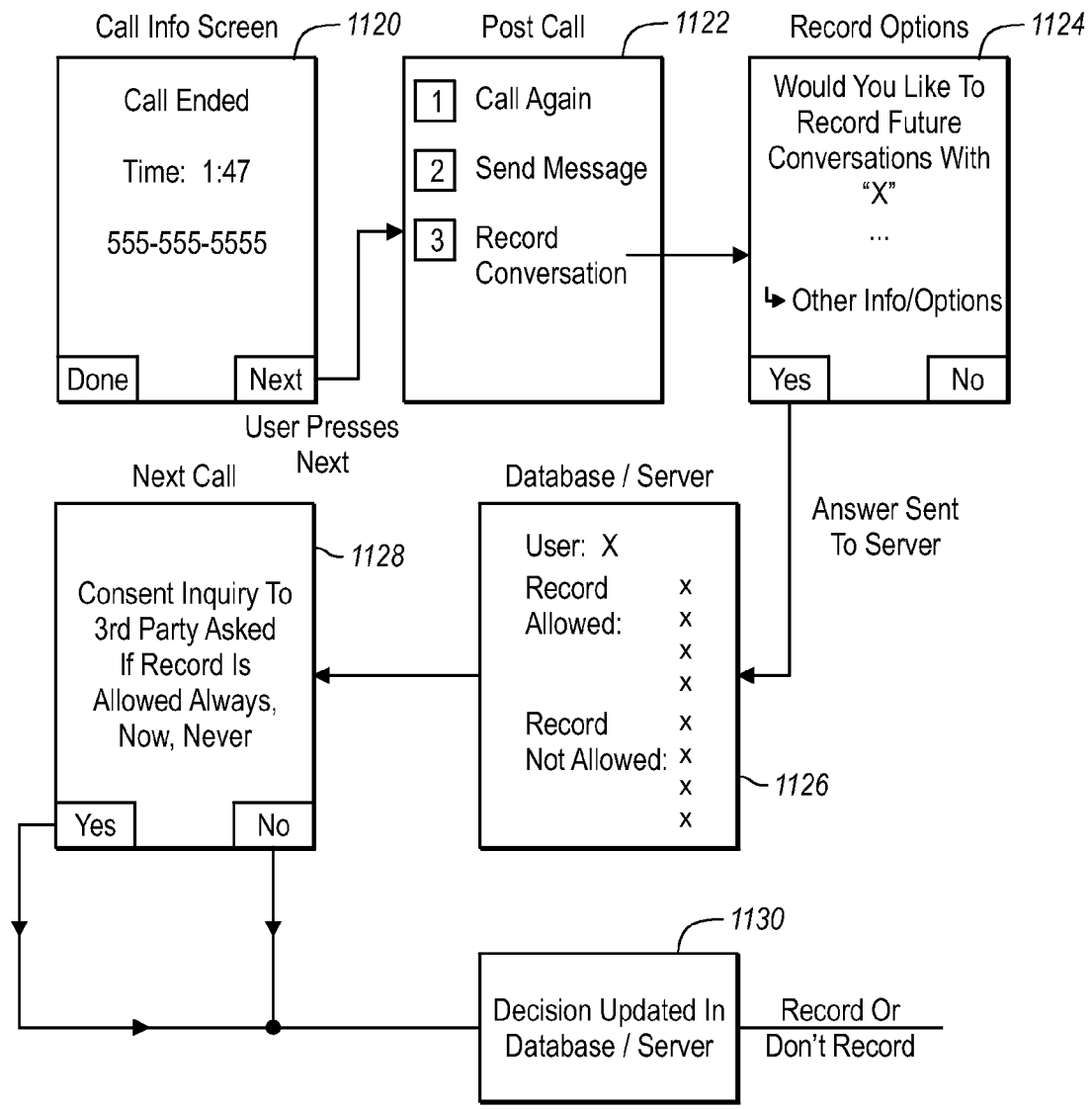
FIG. 11B is block diagram illustrating obtaining consent after a conversation.

FIG. 11B illustrates exemplary screen shots that can be displayed to allow a user to set consent configurations after a telephone conversation. FIG. 11B differs from FIG. 11A in that the process does not allow a user to record the telephone conversation that just ended but only future telephone calls. However, it will be appreciated that screen shots can be modified to adapt to the method of FIG. 11A.

Block 1120 displays a call ending at the recording device. Block 1122 displays options displayed to the recording device user when the user exits out of the call. If the user selects the "record conversation" option, block 1124 appears to ask the user whether the user wants to record future conversations. Block 1126 depicts that the database can be updated with a new consent configuration.

Block 1128 represents the next call between the user of the recording device and the user of the remote device. Block 1128 displays a consent inquiry sent to the remote device. Block 1130 represents that the database is updated with the response of the user of the remote device. Based on the decision of the user recording device and the user of the remote device, the next call can be recorded.

VI. Set Consent Configurations

With reference back to FIG. 3, the recording device allows a user to set up pre-defined consent configurations with regard to certain individuals with whom the user conducts telephone conversations. In addition, as mentioned above, methods provided by the present invention can obtain consent configurations between parties before, during and/or after a conversation has taken place, which configurations can be stored for future reference.

Figure 12A:
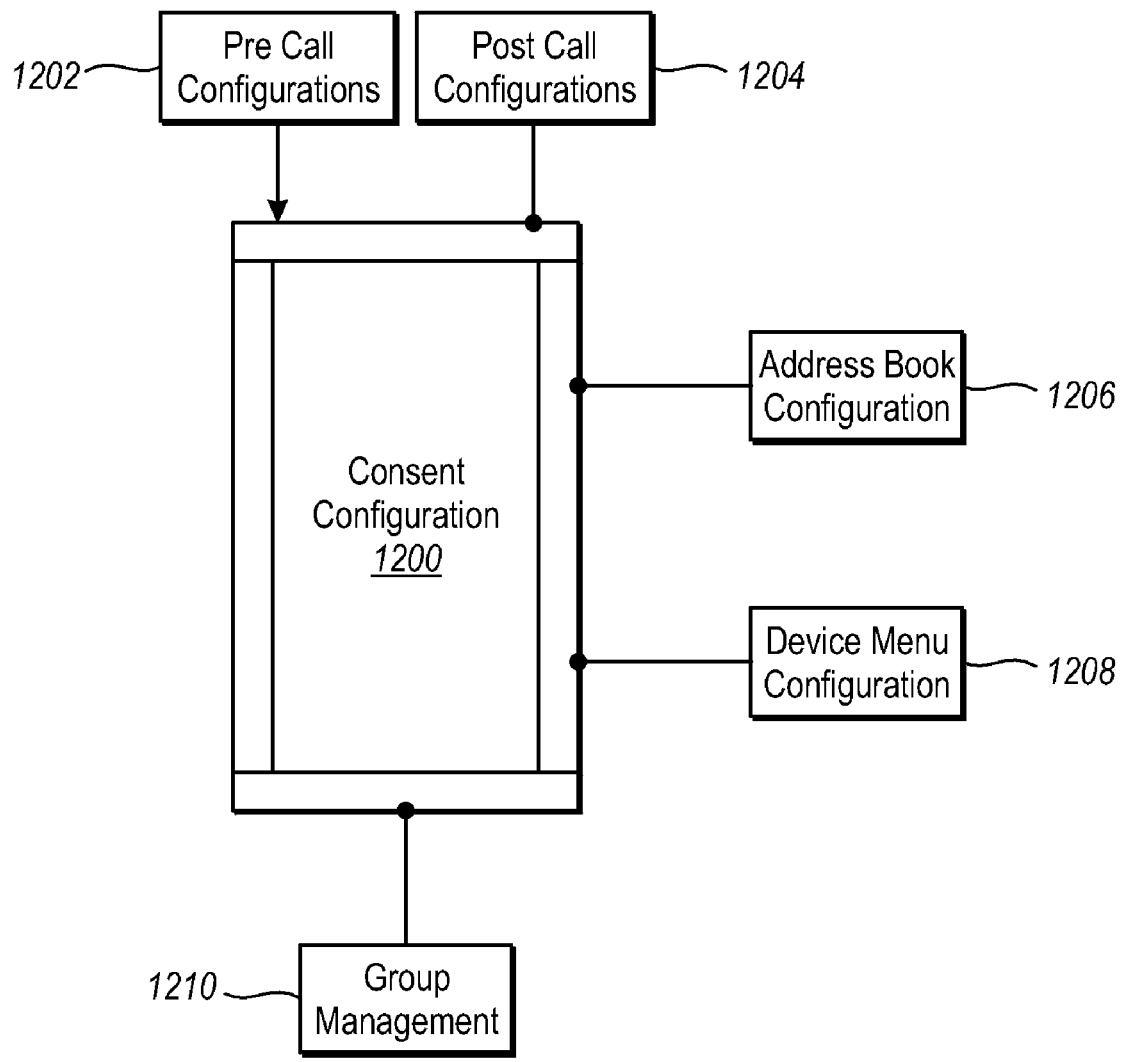
FIG. 12A is a conceptual depiction indicating examples of variables that may affect consent configurations for contacts associated with conversations initiated from a recording device.

FIG. 12A depicts various variables that can be used to generate consent configuration for a remote user and a particular contact or group of contacts. Consent configurations can be stored in a user's address book. An address book can contain one or more individuals and each individual can be associated with one or more groups. The user is able to initiate a telephone call with any individual or group in her address book.

As mentioned above, a contact management module 312 can be used in conjunction with record setup module 306 to access the address book to update a field in the address book for each contact with a consent configuration. As shown in FIG. 12, consent configuration 1200 can be configured in a variety of ways. Pre-call configurations 1202 refers to the system making a consent inquiry to one or more participants of a phone call immediately prior to commencing a telephone conversation to record this and future calls with the same parties. Such pre-call configurations 1202 can be performed using, for example, the method illustrated in FIGS. 10A and 10B. As indicated above, once consent is obtained from one or more participants on the call, this preference is stored as a hidden field in the address book API. The next time a telephone call occurs between the recording device user and a remote device user, assuming the appropriate consents have been received, the recording device can automatically record the call eliminating the additional steps required to obtain consent to record the call.

Post-call configurations 1204 refers to when the system makes a consent inquiry to one or more participants of a phone call after a telephone conversation has ended. Obtaining consent after a phone call has ended can be performed using, for example, the method illustrated in FIGS. 11A and 11B. As described above, after a phone call ends, an audio, pop-up alert or other options menu requests consent from one or more participants on the call to record future calls between the same parties. When consent is obtained from one or more participants, this preference is stored as a hidden field in the address book API. Then, the next time a call occurs between the same parties, the recording device knows to automatically record the call upon obtaining this prior permission from the participants.

Address book configurations 1206 refers to providing an option in the address book to update a field associated with each contact that indicates the level of recording consent that a recording device user has with regard to that particular contact. Various levels of recording consent can be indicated, such as "always record," "never record," "sometimes record." For the "sometimes record" consent level, a field may also be provided to indicate under what circumstances a recording device user may record messages with the user. Together, the consent level and circumstance information may be viewed as a consent configuration for that particular contact.

Figure 12B:
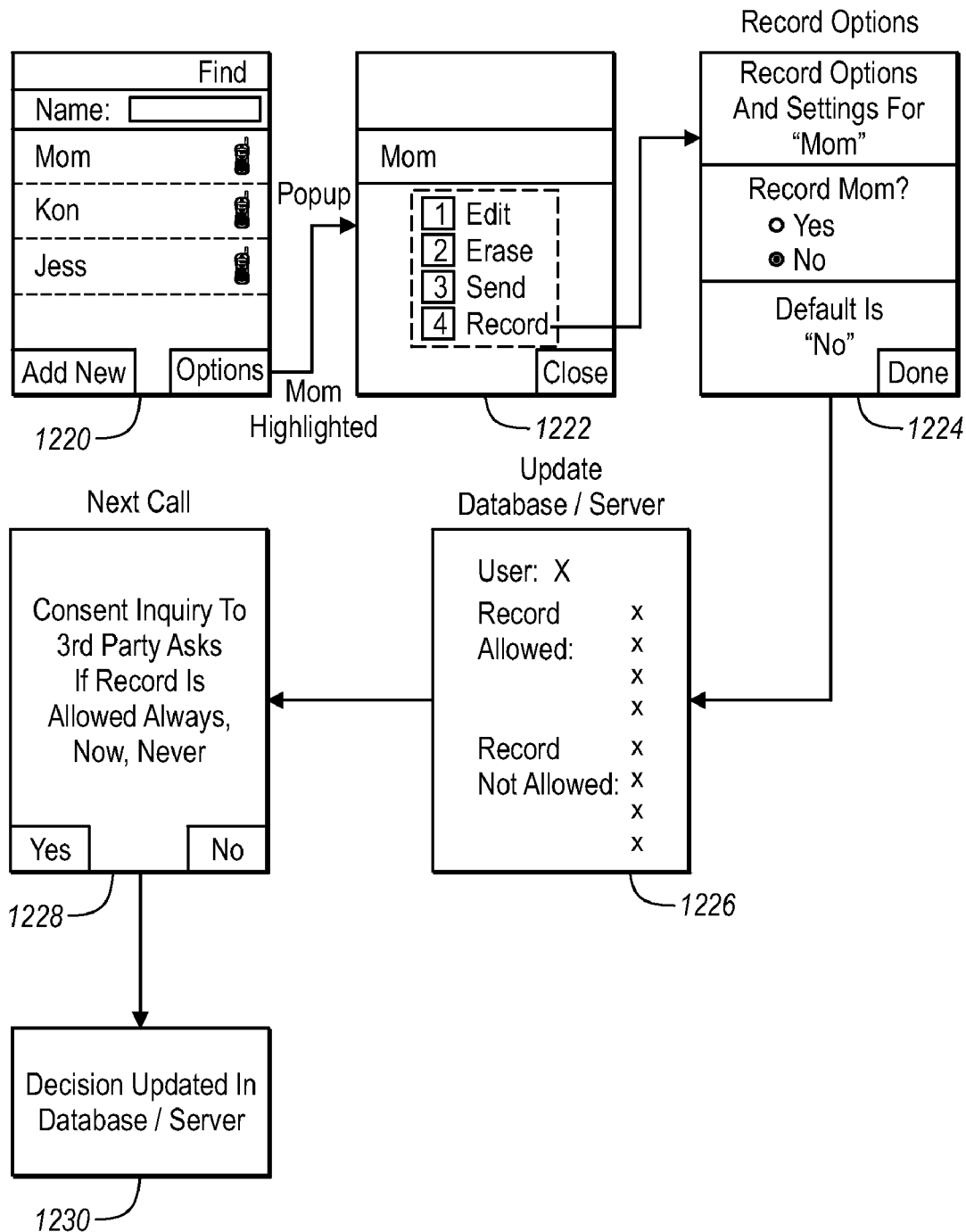
FIG. 12B is a block diagram illustrating setting consent configurations through a user address book.

FIG. 12B illustrates exemplary block diagrams of options that may be provided in an address book accessible by the user of the recording device. Block 1220 illustrates contacts that exist in a user's phone book or address book. Block 1222 illustrates options that a user is provided when the user selects a certain contact (e.g., Mom). One of the options is "record." Block 1224 illustrates recording options the user can select. Depending on the user's preference, Block 1226 depicts that the database is updated with the user's recording preference. Block 1228 depicts a consent inquiry displayed to the contact upon the next call to the contact. Block 1230 depicts an update to the database based on the contact's selection of a consent level.

Device menu configurations 1208 refers to a menu application on the recording device that allows the user to select consent configurations for certain contacts. In one embodiment, selections made by the user can tie into a user's address book located on the recording device and/or a remote server. As such, many of the same methodologies described in FIG. 13 may apply and will not be repeated here. In other words, the contact may have to agree to the consent configuration before the consent configuration is applied to a particular call.

Figure 12C:
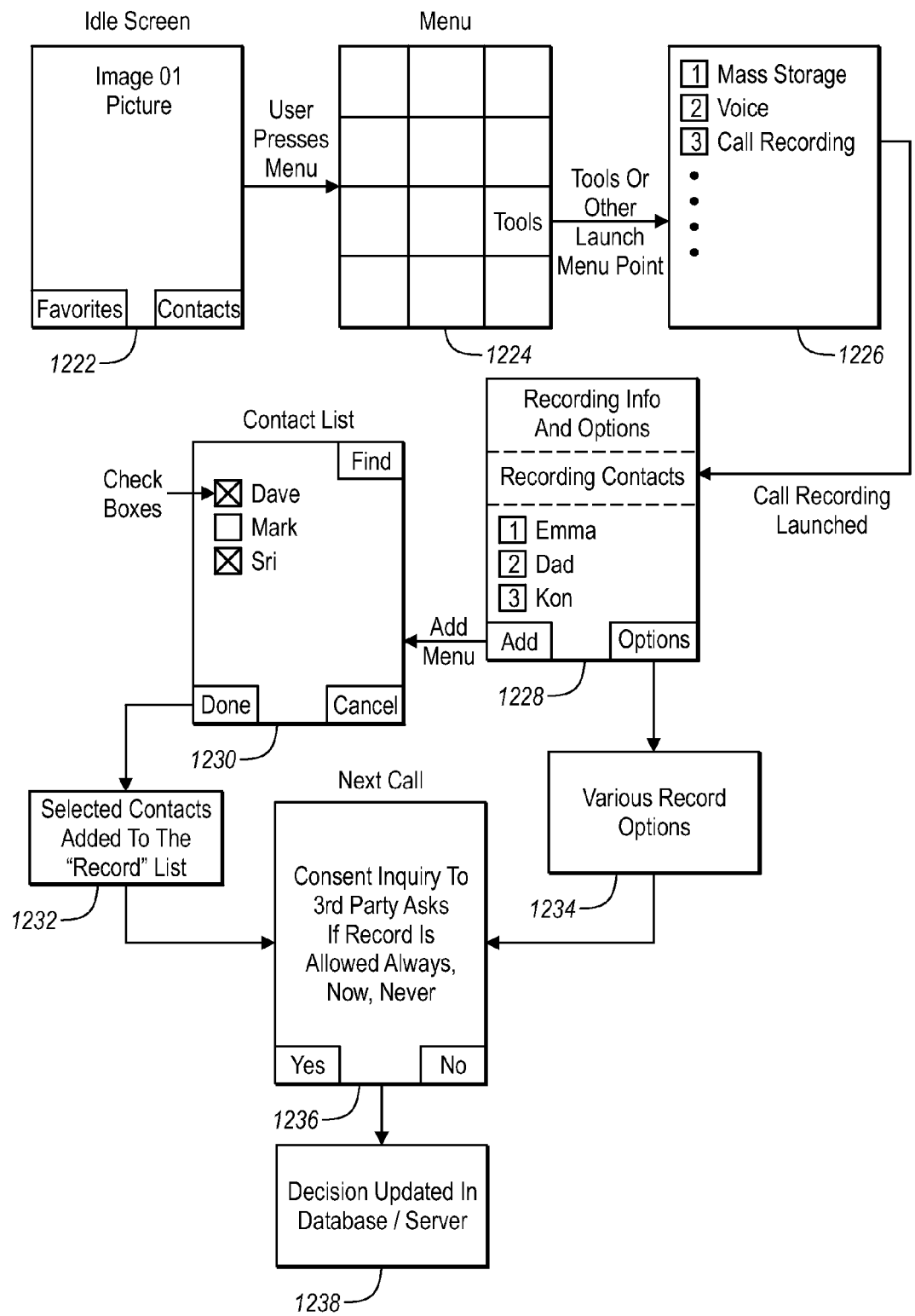
FIG. 12C is a block diagram illustrating setting consent configurations through a menu on the user device.

FIG. 12C illustrates exemplary methodology for using a device menu application to set consent configurations. Block 1222 illustrates the main window of the display of the user of the recording device. Block 1224 displays menu options, one of which being "tools." When the user selects "tools" or another launch menu point, options are displayed to user, depicted in block 1226. The user is provided a "record" option, which, when selected, displays in block 1228 a consent configuration application. A user can add a contact to be added to the "record" list, as shown in block 1230 which shows a list of contacts that the user can potentially select. Block 1232 represents that the selected contacts are added to the "record list." Upon the next call, shown in block 1236, the contact is provided a consent inquiry to determine if the contact agrees to recording conversations with the user. Block depicts that the database is updated depending on the consent level agreed upon by the contact. Block 1234 depicts that the consent configuration application may provide various recording options to the user.

Group management 1210 refers to allowing a user to configure groups of contacts. As mentioned above, in a conference setting of three or more participants, one being the recording device user, it is possible that less than all of the participants agree to having the call recorded. In addition, in many address books, it is possible to combined contacts into a group and it would be desirable to allow a user to define consent configurations for that group that can be different from other consent configurations defined for each individual contact in the user's address book.

Group management 1210 allows a user to set group consent configurations that automatically set the recording device to record a group conversation, such as a phone conference, where all parties in the group have agreed to the recording. To set group consent configurations, a user may access an address book, or any another application that allows interaction with group lists. For example, the group management 1210 can be integrated into group list management applications, such as, but not limited to, the Core Mobility Push-to-Talk service (PTT), Core Mobility Group List Management System (GLMS), Notes Address Book (NAB), and the like.

Figure 12D:
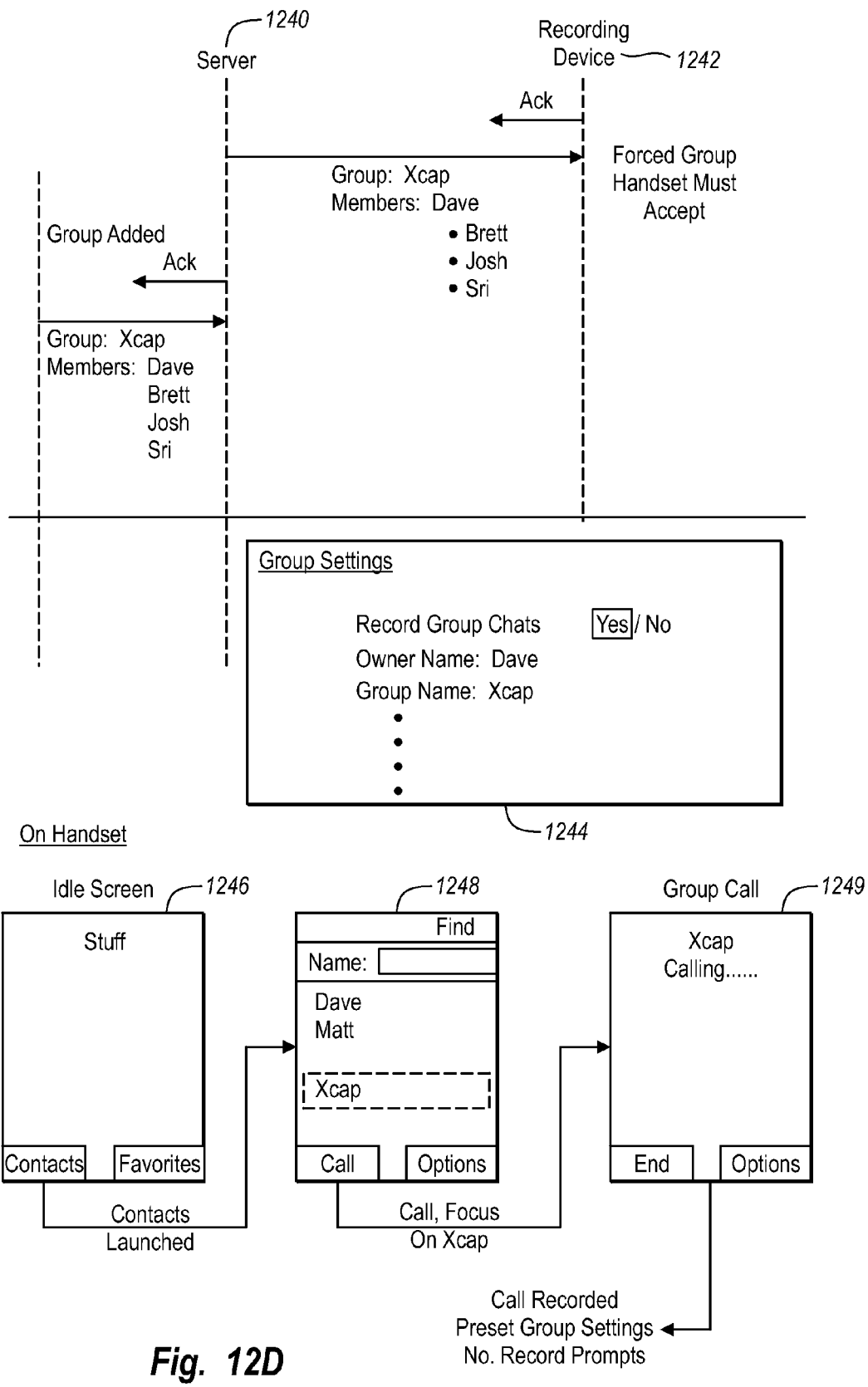
FIG. 12D is a block diagram illustrating setting consent configurations through a group setting.

FIG. 12D shows that a server 1240 can maintain a group list. The group list can associated with a consent configuration 1244 that defines whether or not calls with members of the group can be recorded. The consent configuration 1244 can define one or more consent levels, such as record only one conversation for the group or record all conversations for the group. When the user of the recording device 1242 attempts to join the list, the group list may be a "forced group," such that the user is required to accept the terms of the consent configuration before being added to the list. Block 1246 depicts an idle screen on the a recording device that allows the user to select "contacts" to access her contacts. Block 1248 depicts a contact list, which can also display the group list. When the user selects the group list, block 1249 depicts that a call can be initiated with the members of the group. The call is recorded based on the present consent configuration.

For instance, in GLMS, there is a "forced group" that can be stored on a device, which is a list of contacts sent to a handset. In order for the user to be part of the list of contacts, the user must accept to be part of the list. One group consent configuration that can be associated with the forced group could be "always record" such that if the user desires to be part of the forced group, the user must agree to this configuration. Thus, when conference calls are initiated for this forced group, all parties have already agreed to the recording and further consents do not need to be obtained for conference calls related to this group. Recording prompts that typically are audibly heard by participants on a call being recorded can be eliminated where the forced group has a preset consent configuration to record the call.

The benefit of all the approaches described above is that for each potential participant of a recorded conversation, a consent configuration can be set before the next call. This saves time and makes recording calls easier. In one example, every time a device user wants to call his mom, he does not have to be asked whether the call should be recorded, but when calling his lawyer, the call can be auto-recorded (depending on previously obtained agreement from the lawyer).

Figure 13:
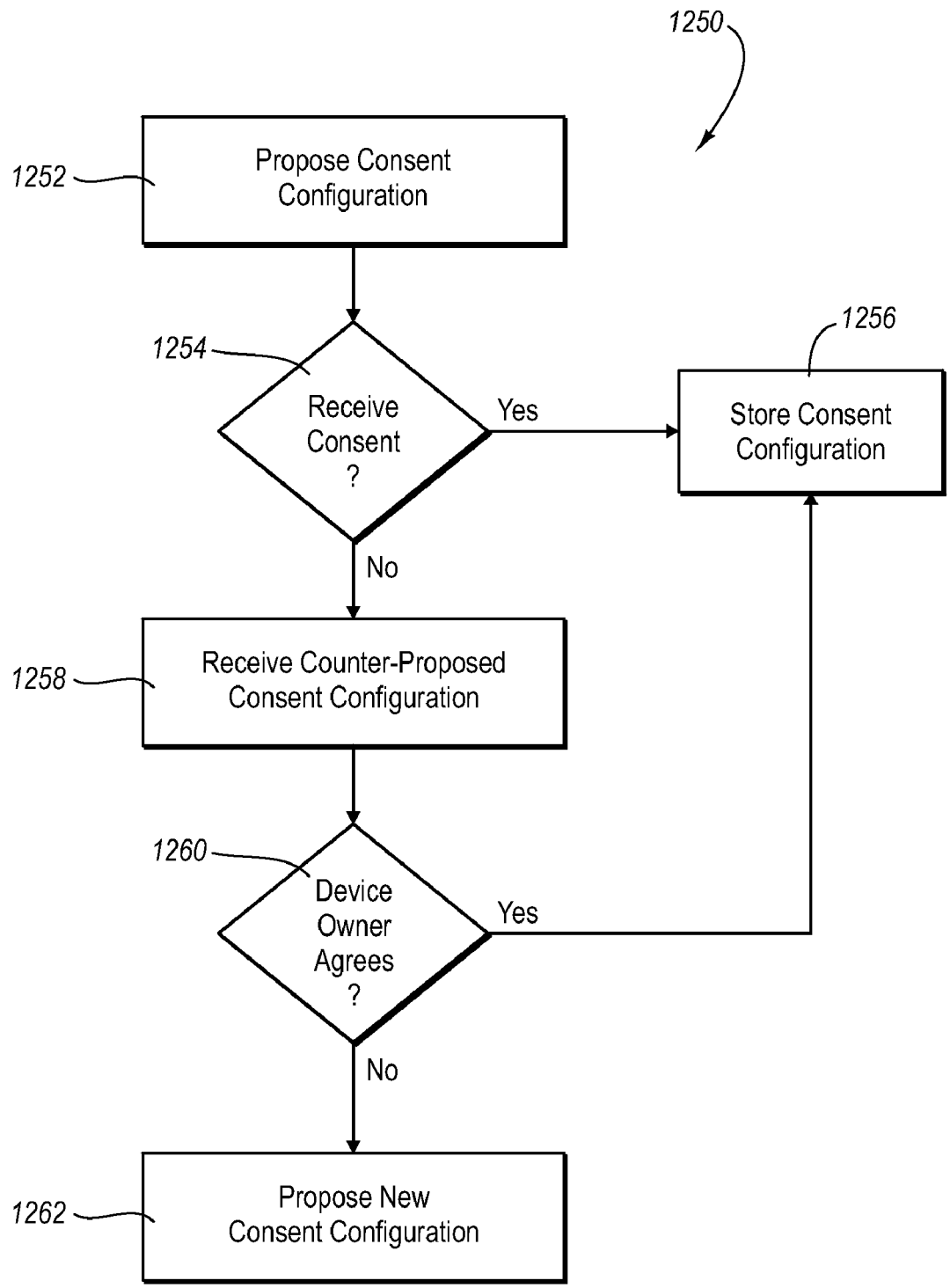
FIG. 13 is a flow chart illustrating aspects of a process for requesting, obtaining and managing consent between two parties.

In order to be able to preset consent configurations, a contact may be required to agree as to the consent level and/or circumstances in which recording conversations may occur. FIG. 13 illustrates an exemplary method 1250 for obtaining consent between parties where consent is not immediately required (e.g., for forced groups) that allows a contact some control over the consent level. The following will be described with reference to the address book configuration. When a recording device user desires to set the consent level of a contact, the user access the address book. The user can access the address book via the recording device, or using a computer that accesses a server containing contact management data.

At 1252, when the user first inputs a proposed consent configuration, the system sends a message to the contact containing information about the proposed consent configuration and requests agreement to the proposed consent configuration. The proposed consent configuration can be sent to the contact via email, IM, text message, or other communication method that is available to the recording device user. At 1254, the system monitors whether a return message is received from the contact, parses a received returned message, and determines whether the contact agrees with the proposed consent configuration. At 1256, if the contact agrees to the proposed consent configuration, the system updates the recording device user's address book to reflect the agreed upon consent configuration.

At 1258, if the contact does not agree to the proposed consent configuration, the contact may be given the opportunity in the message to input a counter-proposed consent configuration. A counter-message is then received from the contact and displayed to the recording device user. At 1260, the recording device user is provided an opportunity to agree to the counter-proposed consent configuration. At 1256, if the user agrees to the counter-proposed consent configuration, the system updates the recording device user's address book to reflect the agreed upon consent configuration.

At 1262, if the recording device user does not agree to the counter-proposed consent configuration, the user can propose a new proposed consent configuration, which is sent to the contact. The process then proceeds to 1254 to determine whether the contact agrees with the new proposed consent configuration.

It will be appreciated that the recording device user can maintain control over any counter-proposed consent configurations. That is, in one embodiment, the user of the remote device is not able to send a counter-proposed consent configuration, only accept or decline proposed consent configurations from the user of the recording device. In one embodiment, method 1200 may require the recording device user and the contact to exactly agree on the consent configuration. In another embodiment, the method 1200 can be modified to only allow two passes at negotiating the consent configuration before the system sets the configuration "never record."

The user may also set different preferences on the number of iterations allowed before terminating the consent process.

Once a consent configuration is stored in the address book, the address book can be consulted when a communication session is detected to determine whether to record the communication session. In addition, if the address book indicates a consent configuration that is "sometimes record" or "never record", the system can identify geographical information for the recording device and/or remote device to determine whether the communication session can be recorded, depending on the jurisdiction. Alternatively, only the voice data for the recording device could be recorded.

VII. Telecommunication Devices and Computing Environments

Embodiments of the present invention may be implemented in connection with a special purpose or general purpose telecommunications device that include both hardware and/or software components, including wireless telephones and other telephony-enabled wireless devices, landline telephones, or special purpose or general purpose computers that are adapted to have telecommunications capabilities.

Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A method for obtaining consent to record voice data in a telecommunications system that includes a remote device and a recording device, the method comprising:

identifying initiation of a communication session;

generating a consent inquiry to the recording device to determine whether a user of the recording device consents to recording at least the communication session;

determining whether the user of the recording device consents to recording at least the communication session;

generating a consent inquiry to the remote device to determine whether a user of the remote device consents to recording at least the communication session if the user of the recording device consents to recording at least the communication session;

determining whether the user of the remote device consents to recording at least the communication session;

recording the communication session if the user of the remote device consents to recording at least the communication session; and implementing at least one course of action if the user of the remote device does not consent to recording at least the communication session, wherein implementing at least one course of action if the user of the remote device does not consent to recording at least the communication session further comprises:

obtaining information concerning a geographical location of at least one of the remote device and the recording device;

using a set of data recording rules that define conditions under which one or more jurisdictions permit recording of voice data to determine whether to record the communication session even if the user of the remote device does not consent to recording at least the communication session; and recording at least the communication session if the geographical location of at least one of the remote device and the recording device correspond to one or more jurisdictions that permit recording of voice data.

2. The method as recited in claim 1, wherein, determining whether the user of the recording device consents to recording at least the communication session comprises determining that the user of the recording device consents to recording future communication sessions with the user of the remote device, and wherein, determining whether the user of the remote device consents to recording at least the communication session comprises determining that the user of the remote device consents to recording future communication sessions with the user of the recording device;
further comprising:
updating a consent configuration indicating that the user of the recording device and the user of the remote device both consent to recording future communication sessions with each other.

3. The method as recited in claim 2, further comprising:
identifying initiating of a future communication session between the recording device and the remote device;
accessing the consent configuration to determine that the user of the recording device and the user of the remote device both consent to recording future communication sessions with each other; and
recording the future communication session.

4. The method as recited in claim 1, wherein implementing at least one course of action if the user of the remote device does not consent to recording at least the communication session further comprises:
recording voice data generated by the user of the recording device without recording voice data generated by the user of the remote device.

5. The method as recited in claim 1, wherein generating a consent inquiry to the recording device and/or remote device to determine whether a user of the recording device and/or remote device consents to recording at least the communication session further comprising generating at least one of:
a popup window containing a consent inquiry; or
an audio recording containing a consent inquiry.

6. The method as recited in claim 1, wherein determining whether the user of the recording device and/or remote device consents to recording at least the communication session further comprises:
receiving input from the user of the recording device and/or remote device in the form of at least one of audio input, data input, or DMTF tonal input.

7. A method for obtaining consent to record voice data in a telecommunications system that includes a remote device and a recording device, the method comprising:
identifying termination of a communication session;
generating a consent inquiry to the recording device to determine whether a user of the recording device consents to recording future communication sessions;
determining whether the user of the recording device consents to recording future communication sessions;
generating a consent inquiry to the remote device to determine whether a user of the remote device consents to recording future communication sessions;
determining whether the user of the remote device consents to recording future communication sessions;
storing future communication sessions if the user of the recording device and the user of the remote device consents to recording of future communication sessions; and
implementing at least one course of action if the user of the remote device does not consent to recording future communication sessions, wherein implementing at least one course of action if the user of the remote device does not consent to recording future communication sessions further comprises:
obtaining information concerning a geographical location of at least one of the remote device and the recording device;
using a set of data recording rules that define conditions under which one or more jurisdictions permit recording of voice data to determine whether to record the communication session even if the user of the remote device does not consent to recording future communication sessions; and
storing the recording of future communication sessions if the geographical location of at least one of the remote device and the recording device correspond to one or more jurisdictions that permit recording of voice data.

8. The method as recited in claim 7,
wherein, determining whether the user of the remote device consents to recording future communication sessions comprises determining that the user of the remote device consents to recording future communication sessions with the user of the recording device;
further comprising:
updating a consent configuration indicating that the user of the recording device and the user of the remote device both consent to recording future communication sessions with each other.

9. The method as recited in claim 8, further comprising:
identifying initiating of a future communication session between the recording device and the remote device;
accessing the consent configuration to determine that the user of the recording device and the user of the remote device both consent to recording future communication sessions with each other; and
recording the future communication session.

10. The method as recited in claim 7, wherein implementing at least one course of action if the user of the remote device does not consent to recording future communication sessions further comprises:
storing recorded voice data generated by the user of the recording device without recording voice data generated by the user of the remote device.

11. The method as recited in claim 7, wherein generating a consent inquiry to the remote device to determine whether a user of the recording device consents to recording future communication sessions further comprising generating at least one of:
a popup window containing a consent inquiry; or
an audio recording containing a consent inquiry.

12. The method as recited in claim 7, wherein determining whether the user of the remote device consents to recording future communication sessions further comprises:
receiving input from the user of the remote device in the form of at least one of audio input, data input, or DMTF tonal input.

13. A method for allowing a user of a recording device to set consent configurations with one or more individuals in an address book owned by the user of the recording device, the method comprising:
identifying a request by the user of the recording device to set a consent configuration for a user of a remote device;
identifying a first consent configuration level selected by the user of the recording device;
sending a proposed consent configuration to the user of the remote device containing the first consent configuration level;
determining whether the user of the remote device consents to the proposed consent configuration; and
upon identifying consent from the user of the remote device, updating a database indicating that the user of the remote device consents to the proposed consent configuration.

14. The method as recited in claim 13, further comprising, if the user of the remote device does not consent to the proposed consent configuration, identifying a counter-proposed consent configuration containing a second consent configuration level selected by the user of the remote device; and determining whether the user of the recording device consents to the counter-proposed consent configuration; and upon identifying consent from the user of the recording device, updating the database indicating that the user of the remote device consents to the counter-proposed consent configuration.

15. The method as recited in claim 13, further comprising, if the user of the remote device does not consent to the proposed consent configuration, identifying a second consent configuration level selected by the user of the recording device;

sending a counter-proposed consent configuration to the user of the remote device containing the second consent configuration level;

determining whether the user of the remote device consents to the counter-proposed consent configuration; and upon identifying consent from the user of the remote device, updating the database indicating that the user of the remote device consents to the counter-proposed consent configuration.

16. The method as recited in claim 13, wherein sending a proposed consent configuration to a user of a remote device containing the first consent configuration level comprises sending a message via at least one of email, instant messaging, or text messaging.

17. The method as recited in claim 13, further comprising:

identifying initiation of a communication session between the recording device and the remote device;

using the database to determine a consent configuration associated between the recording device and the remote device; and recording the communication session if the consent configuration stored in the database indicates a consent configuration level that allows recording the communication session.

18. The method as recited in claim 17, further comprising, if the consent configuration stored in the database indicates that the user of the remote device has not consented to a proposed consent configuration:

obtaining information concerning a geographic location of at least one of the remote device and the recording device; and identifying a recording action that can be performed on voice data in response to specified criteria that include the geographic location of at least one of the remote device and the recording device.

19. A method for configuring a consent configuration for recording communication sessions for a group of participants, the method comprising:

receiving a request from a first participant requesting inclusion in a group list;

generating a consent inquiry including a consent level to a device of the first participant to determine whether the first participant agrees to the consent level;

determining whether the first participant agrees to the consent level;

allowing the first participant to be part of the group list only if the first participant agrees to the consent level; and storing at least one future communication session for the group list based on the consent level.

20. The method as recited in claim 19, wherein the consent level comprises:

storing at least one future communication session for the group list; or storing all future communication sessions for the group list.

* * * * *

UNITED STATES PATENT AND TRADEMARK OFFICE
CERTIFICATE OF CORRECTION

PATENT NO. : 8,077,832 B2  Page 1 of 1
APPLICATION NO. : 11/745391
DATED : December 13, 2011
INVENTOR(S) : Othmer et al.

It is certified that error appears in the above-identified patent and that said Letters Patent is hereby corrected as shown below:

In Column 8, Line 34, delete "from a a switch" and insert -- from a switch --, therefor.

In Column 11, Line 5, delete "party involved" and insert -- party 602 involved --, therefor.

In Column 11, Line 22, delete "thereof" and insert -- thereof. --, therefor.

In Column 12, Line 8, delete "are a recorded." and insert -- are recorded. --, therefor.

In Column 15, Line 10, delete "and a type" and insert -- and type --, therefor.

In Column 21, Line 17, delete "Block" and insert -- Block 1238 --, therefor.

In Column 21, Line 53, delete "on the a" and insert -- on the --, therefor.

Signed and Sealed this
Twenty-eighth Day of February, 2012

David J. Kappos
*Director of the United States Patent and Trademark Office*